United States Patent
Inoue

(10) Patent No.: US 8,743,298 B2
(45) Date of Patent: Jun. 3, 2014

(54) DISPLAY DEVICE

(75) Inventor: Yuichi Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 13/230,177

(22) Filed: Sep. 12, 2011

(65) Prior Publication Data

US 2012/0069264 A1 Mar. 22, 2012

(30) Foreign Application Priority Data

Sep. 17, 2010 (JP) .................................. 2010-209717

(51) Int. Cl.
*G02F 1/1335* (2006.01)
(52) U.S. Cl.
USPC .......................................................... 349/8
(58) Field of Classification Search
USPC .......................................................... 349/8
See application file for complete search history.

(56) References Cited

U.S. PATENT DOCUMENTS

| | | | | |
|---|---|---|---|---|
| 4,120,567 A | * | 10/1978 | Goodman et al. | ............ 349/177 |
| 5,945,965 A | * | 8/1999 | Inoguchi et al. | .................. 345/6 |
| 6,040,885 A | * | 3/2000 | Koike et al. | .................... 349/129 |
| 2007/0165164 A1 | * | 7/2007 | Sugiyama | ..................... 349/117 |
| 2009/0195728 A1 | | 8/2009 | Obata et al. | |

FOREIGN PATENT DOCUMENTS

JP 2008-262165 A 10/2008

\* cited by examiner

*Primary Examiner* — Phu Vu
(74) *Attorney, Agent, or Firm* — Wolf, Greenfield & Sacks, P.C.

(57) ABSTRACT

A display device includes: a light source section; first to third polarization plates disposed in this order from a side of the light source section; a liquid crystal display section provided in one of first and second regions, in which the first region lying between the first polarization plate and the second polarization plate and the second region lying between the second polarization plate and the third polarization plate; a liquid crystal barrier section provided in the other of the first and second regions and including a plurality of opening-closing sections to transmit or block light. An absorption axis of the third polarization plate is horizontally directed.

11 Claims, 17 Drawing Sheets

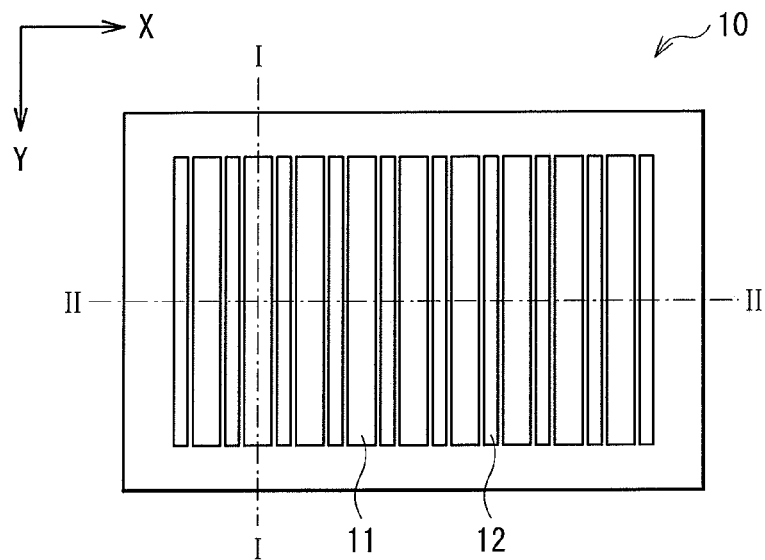
FIG. 6A
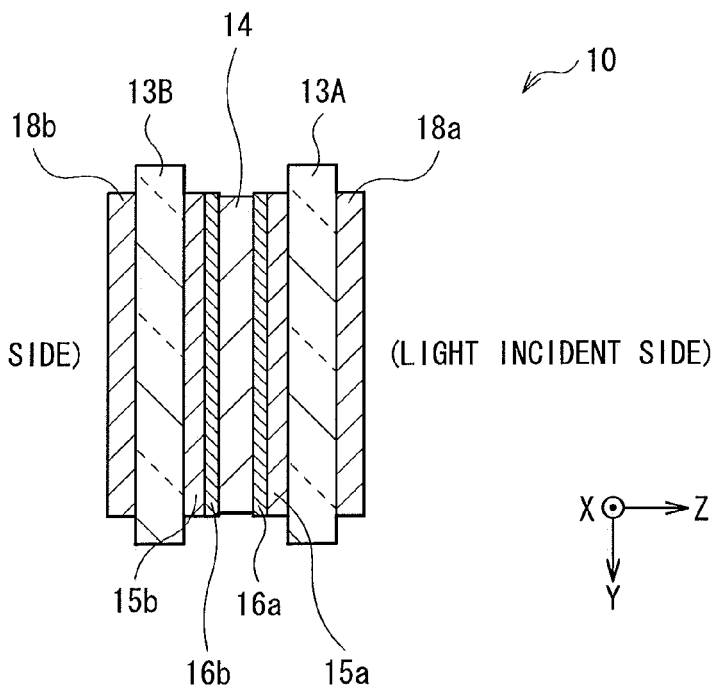
FIG. 6B (LIGHT EMITTING SIDE)    (LIGHT INCIDENT SIDE)

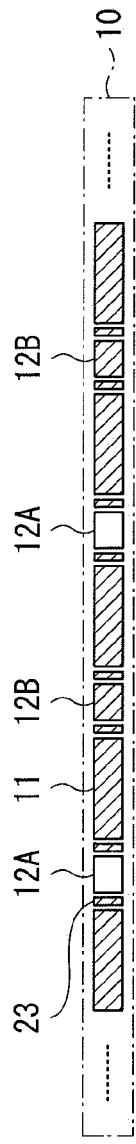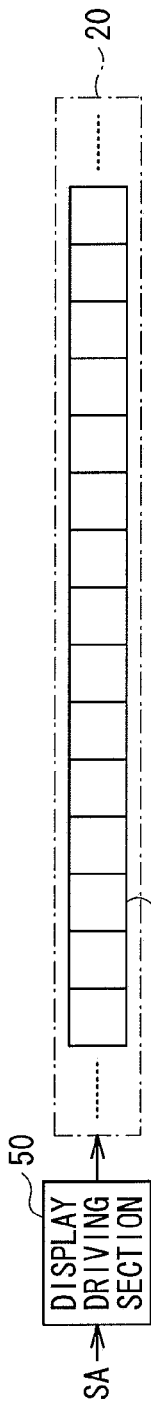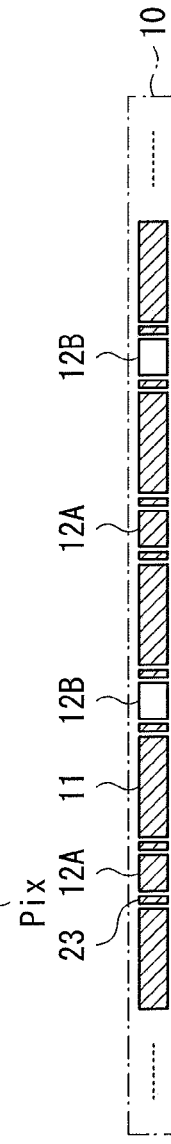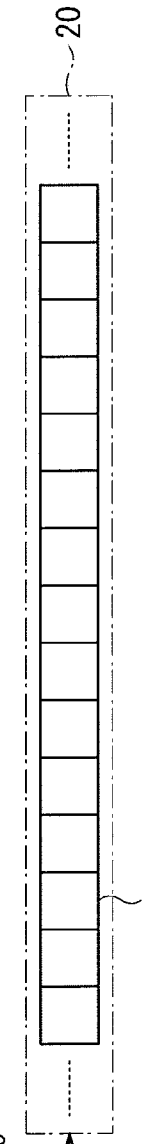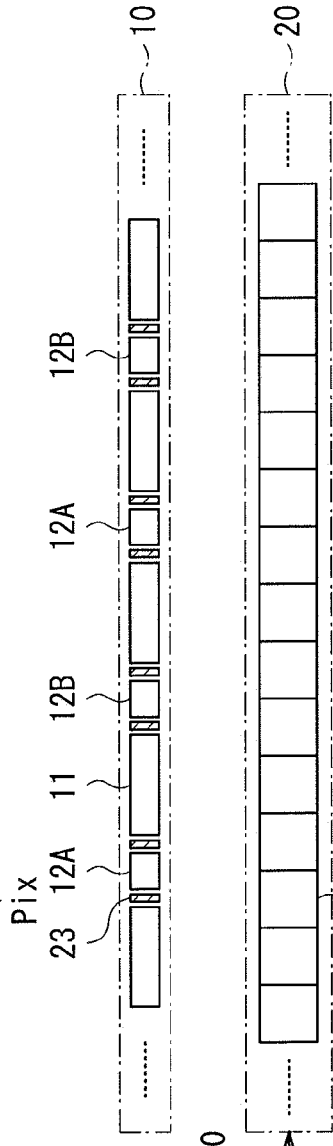
FIG. 10A  FIG. 10B  FIG. 10C

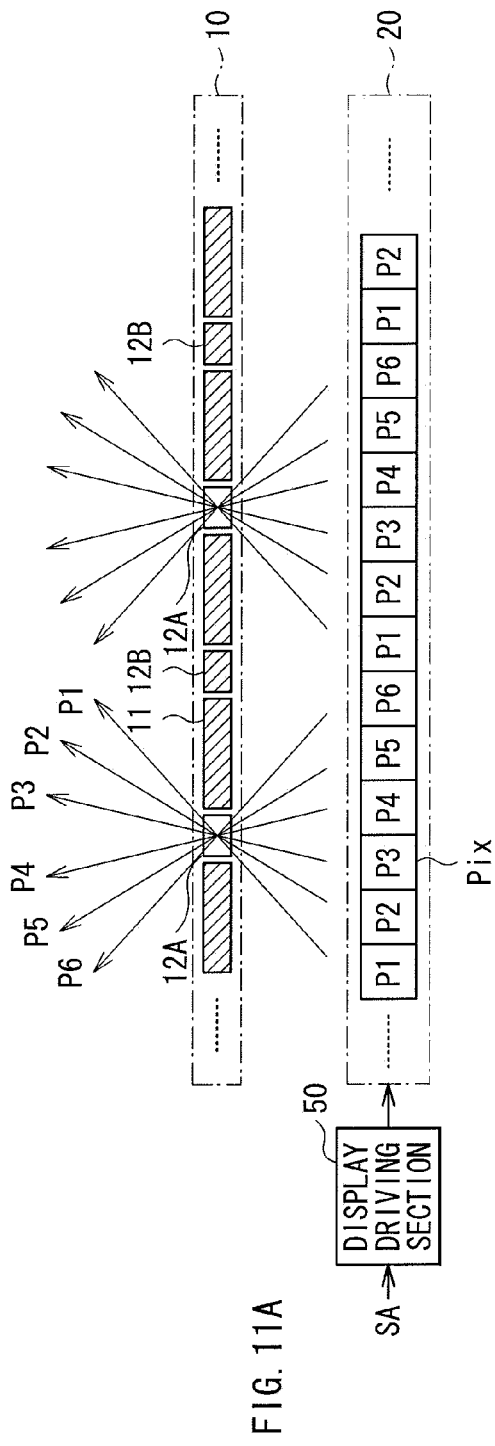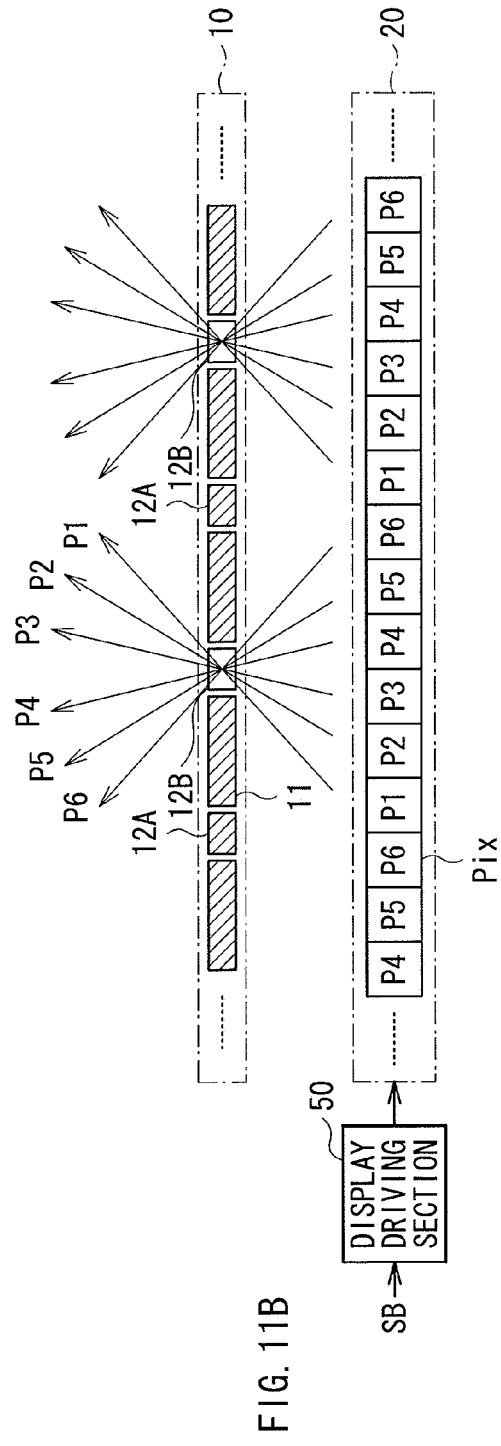

DISPLAY DEVICE

BACKGROUND

The present disclosure relates to a display device capable of performing a stereoscopic display using a parallax barrier system.

In recent years, display devices (stereoscopic display devices) capable of performing a stereoscopic display are drawing attention. The stereoscopic display refers to a technique for displaying an image for a left eye and an image for a right eye having parallax therebetween (having different viewpoints from each other), and a viewer, by viewing the image for the left eye and the image for the right eye with his/her left and right eye respectively, can recognize the images as a stereoscopic image having a depth feeling. In addition, display devices which are capable of providing viewers with more natural stereoscopic images by displaying three or more images having parallax thereamong have been also developed.

The stereoscopic display devices fall in two major categories: stereoscopic display devices that require dedicated eyeglasses and stereoscopic display devices that do not require dedicated eyeglasses. Since the dedicated eyeglasses are troublesome for the viewer, the stereoscopic display devices that do not require dedicated eyeglasses are desired. As the stereoscopic display devices that do not require dedicated eyeglasses, stereoscopic display devices using lenticular lens system, parallax barrier system, and the like are available, for example.

Among them, stereoscopic display devices using parallax barrier system utilize, for example, a liquid crystal display (LCD) device to display, in a space-divisional manner, the above-mentioned image for the left eye and the image for the right eye, and are provided with a predetermined barrier on the display surface thereof. In the related art, as disclosed in Japanese Unexamined Patent Application Publication No. 2008-262165 for example, various types of liquid crystal display devices are developed, and in recent years, VA (Vertical Alignment) mode, IPS (In Plane Switching) mode, and the like are often used. As the barrier, a liquid crystal barrier driven in VA mode, IPS mode, TN mode, or the like is used.

Incidentally, the above-mentioned liquid crystal display device has typically a display panel including a liquid crystal layer and a backlight, and the liquid crystal display device modulates illuminating light from the backlight in the display panel to thereby perform an image display. A pair of polarization plates are stuck to the light incident side and the light emitting side of the display panel so as to control the polarization direction of light incident on the display panel and the polarization direction of light emitted from the display panel.

SUMMARY

As described above, since the liquid crystal display device performs image display with use of polarization, the display panel is sandwiched between a pair of polarization plates in order to control the polarization direction of light incident on the display panel and the polarization direction of light emitted from the display panel. In the case where the display panel is driven in, for example, VA mode or IPS mode, one of absorption axes of the polarization plates is horizontally directed, and the other is vertically directed. That is, image light emitted from the liquid crystal display device is polarized light which depends on the absorption axis of the polarization plate disposed on the light emitting side (viewer side) of the display panel (hereinafter referred to as the polarization plate on the emitting side of the panel).

In this regard, in order for the viewer wearing polarized eyeglasses such as polarized sunglasses to visually recognize a display image, an absorption axis direction of the polarization plate on the emitting side of the panel of a liquid crystal display device is configured to be identical to an absorption axis direction of the polarized eyeglasses, in many cases. Such a configuration of an absorption axis is, for example, intended to cut light reflected from water surface or the like, and in this case, the absorption axis of the polarization plate on the emitting side of the panel of the liquid crystal display device is also configured to be horizontally directed.

However, in the case where a liquid crystal barrier is additionally provided on the light emitting side of such a liquid crystal display device in order to perform a stereoscopic display, the following issue arises. In other words, also in a liquid crystal barrier, similarly to the above-mentioned display panel, a pair of polarization plates (a polarization plate on the incident side of the barrier, a polarization plate on the emitting side of the barrier) are disposed on the light incident side and the light emitting side in such a manner that absorption axis directions thereof are orthogonal to each other. Accordingly, the polarization plates are disposed such that an absorption axis of the polarization plate on the incident side of the barrier is horizontally directed, and that an absorption axis of the polarization plate on the emitting side of the barrier is vertically directed. Consequently, the absorption axis direction of the polarization plate on the emitting side of the barrier (the vertical direction) disposed on the side closest to the viewer does not correspond to an absorption axis direction of the polarized eyeglasses (the horizontal direction), and therefore, when viewed through the polarized eyeglasses, the display image can be visually recognized as a completely dark image.

It is desirable to provide a display device which is capable of performing a stereoscopic display of the parallax barrier system while maintaining good visibility for the viewer wearing polarized eyeglasses.

A first display device according to an embodiment of the present disclosure includes: a light source section; first to third polarization plates disposed in this order from the light source section side; a liquid crystal display section provided in one of first and second regions, the first region lying between the first polarization plate and the second polarization plate, and the second region lying between the second polarization plate and the third polarization plate; and a liquid crystal barrier section provided in the other of the first and second regions, and including a plurality of opening-closing sections to transmit or block light. An absorption axis of the third polarization plate is horizontally directed.

In the first display device according to the embodiment of the present disclosure, in the process where light emitted from the light source section passes through the first to third polarization plates in this order, the liquid crystal display section displays a predetermined image, and each of the opening-closing sections of the liquid crystal barrier section transmits or blocks the light to separate the image, and thereby a stereoscopic display is accomplished. In this case, the absorption axis of the polarized eyeglasses such as polarized sunglasses is configured along the horizontal direction. The absorption axis of the third polarization plate is also horizontally directed. Therefore, it is easier for the image light emitted from the third polarization plate to be visually recognized through the polarized eyeglasses.

A second display device according to the embodiment of the present disclosure includes: a light source section; first to fourth polarization plates disposed in this order from the light source section side; a liquid crystal display section provided between the first polarization plate and the second polarization plate; a liquid crystal barrier section provided between the third polarization plate and the fourth polarization plate, and including a plurality of opening-closing sections to transmit or block light; and a half-wavelength plate provided between the second polarization plate and the third polarization plate. An absorption axis of the fourth polarization plate is directed to an orientation of 45 degrees from a horizontal direction.

In the second display device according to the embodiment of the present disclosure, in the process where light emitted from the light source section passes through the first to fourth polarization plates in this order, the liquid crystal display section displays a predetermined image, and each of the opening-closing sections of the liquid crystal barrier section transmits or blocks the light to separate the image, and thereby the stereoscopic display is accomplished. In this case, the absorption axis of the polarized eyeglasses such as polarized sunglasses is configured along the horizontal direction. The absorption axis of the fourth polarization plate is directed to an orientation of 45 degrees from the horizontal direction, and therefore, the image light emitted from the fourth polarization plate contains polarization component in the vertical direction. As a result, it is possible for the viewer to visually recognize through the polarized eyeglasses the display image.

According to the first display device according to the embodiment of the present disclosure, in the process where light emitted from the light source section passes through the first to third polarization plates in this order, the liquid crystal display section displays a predetermined image, and each of the opening-closing sections of the liquid crystal barrier section transmits or blocks the light, and thereby a stereoscopic display is accomplished. In this case, since the absorption axis of the third polarization plate is horizontally directed, it is easy for the display image to be visually recognized through the polarized eyeglasses such as polarized sunglasses. Consequently, it is possible to implement a stereoscopic display of the parallax barrier system while maintaining good visibility for the viewer wearing polarized eyeglasses.

According to the second display device according to the embodiment of the present disclosure, in the process where light emitted from the light source section passes through the first to fourth polarization plates in this order, the liquid crystal display section displays a predetermined image, and each of the opening-closing sections of the liquid crystal barrier section transmits or blocks the light, and thereby a stereoscopic display is accomplished. In this case, since the absorption axis of the fourth polarization plate is directed to an orientation of 45 degrees from the horizontal direction, it is possible for the display image to be visually recognized through the polarized eyeglasses such as polarized sunglasses. As a result, it is possible to implement a stereoscopic display of the parallax barrier system while maintaining good visibility for the viewer wearing polarized eyeglasses.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate an embodiment and, together with the specification, serve to explain the principles of the technology.

FIG. 6A is an explanatory view illustrating a plane configuration of the liquid crystal barrier shown in FIG. 1, and FIG. 6B is an explanatory view illustrating a sectional configuration of the liquid crystal barrier shown in FIG. 1.

FIGS. 10A to 10C are schematic views illustrating exemplary operations of the display section and the liquid crystal barrier according to the embodiment.

FIGS. 11A and 11B are other schematic views illustrating exemplary operations of the display section and the liquid crystal barrier according to the embodiment.

DETAILED DESCRIPTION

Now, an embodiment of the present disclosure will be specifically described with reference to the drawings. The description will be made in the following order.
1. Embodiment (an example of a stereoscopic display device in which a liquid crystal barrier (VA, IPS) is disposed on a light emitting side of a display section)
2. Modification 1 (an exemplary case in which one polarization plate is disposed between a crystal barrier and a display section)
3. Modification 2 (an exemplary case in which a liquid crystal barrier (VA, IPS) is disposed between a backlight and a display section)

4. Modification 3 (an exemplary case in which a liquid crystal barrier (TN) whose orientation is controlled in the horizontal direction and the vertical direction is adopted)
5. Modification 4 (an exemplary case in which a liquid crystal barrier (TN) whose orientation is controlled in 45-degree direction and 135-degree direction is adopted)

[General Configuration]

Figure 1:
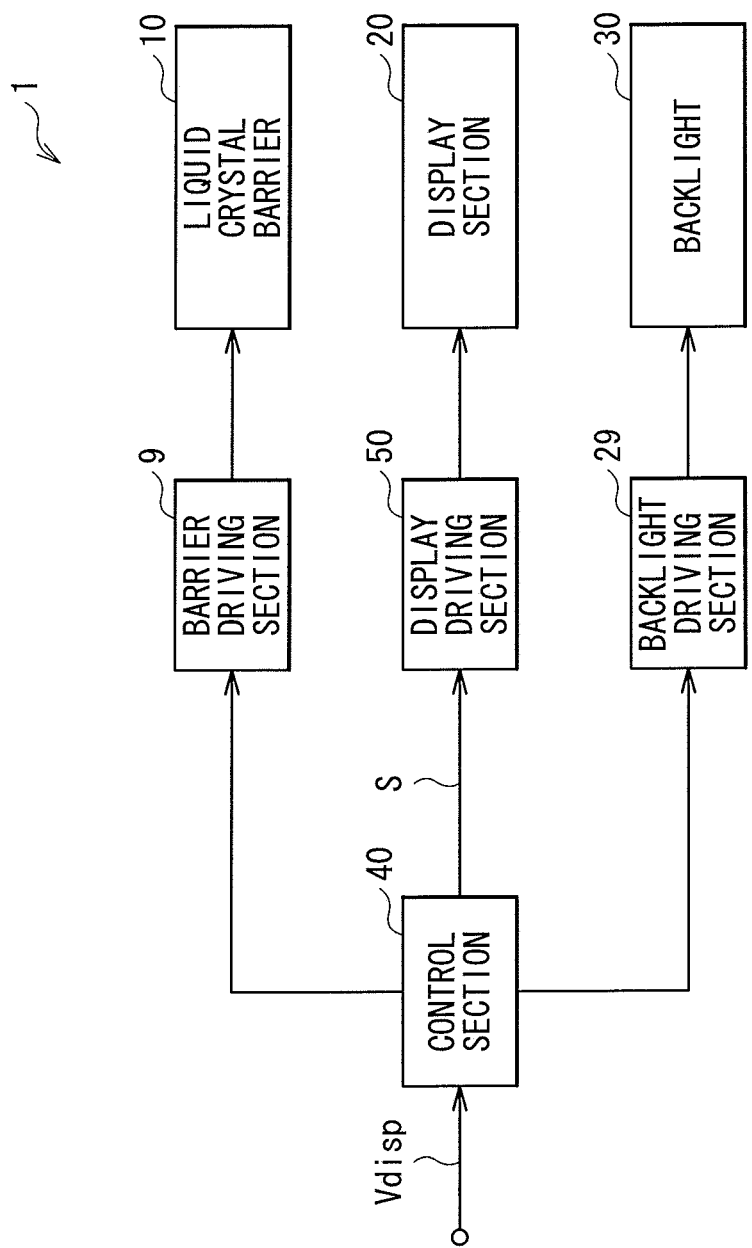
FIG. 1 is a block diagram illustrating an exemplary configuration of a stereoscopic display device according to an embodiment of the present disclosure.

FIG. 1 is a block diagram illustrating a general configuration of a stereoscopic display device (stereoscopic display device 1) according to an embodiment of the present disclosure. In this case, the stereoscopic display device 1 is a display device capable of implementing both stereoscopic display and normal display (two-dimensional display). The stereoscopic display device 1 includes a control section 40, a display driving section 50, a display section 20 (liquid crystal display section), a backlight driving section 29, a backlight 30, a barrier driving section 9, and a liquid crystal barrier 10 (liquid crystal barrier section). It is to be noted that, description will be made assuming that X direction is the horizontal direction (lateral direction) and Y direction is the vertical direction (perpendicular direction).

The control section 40 is a circuit which supplies a control signal, based on an externally-supplied image signal Vdisp, to each of the display driving section 50, the backlight driving section 29, and the barrier driving section 9, and controls these sections to operate in synchronism with each other. Specifically, the control section 40 supplies an image signal S based on the image signal Vdisp to the display driving section 50, supplies a backlight control order to the backlight driving section 29, and supplies a barrier control order to the barrier driving section 9. In this case, as will be described later, the image signal S is made up of image signals SA and SB each including a plurality of (six, in this case) viewpoint images in the case where the stereoscopic display device 1 performs a stereoscopic display.

The display driving section 50 drives the display section 20 on the basis of the image signal S supplied from the control section 40. The display section 20 drives a liquid crystal element to modulate light emitted from the backlight 30, thereby performing a display.

The backlight driving section 29 drives the backlight 30 on the basis of the backlight control signal supplied from the control section 40. The backlight 30 has a function for emitting plane emitting light to the display section 20.

The barrier driving section 9 drives the liquid crystal barrier 10 on the basis of the barrier control order supplied from the control section 40. The liquid crystal barrier 10 includes a plurality of opening-closing sections 11 and 12 (described later) configured of liquid crystal, and has a function for transmitting or blocking the light emitted from the backlight 30 and transmitted through the display section 20.

Figure 2A:
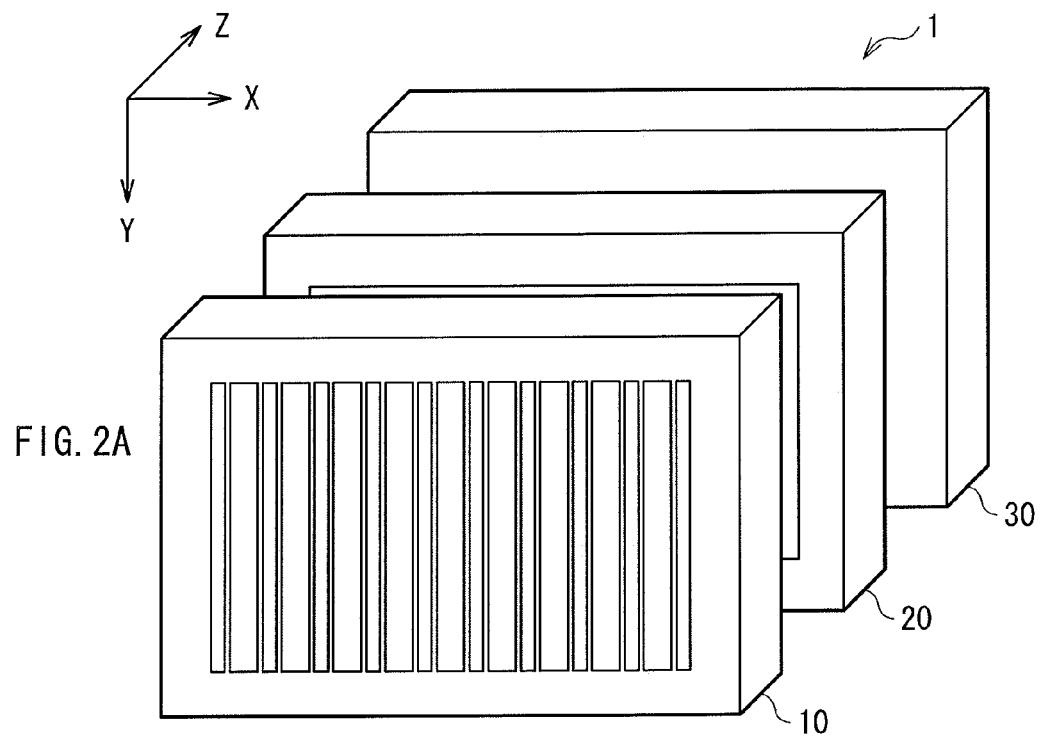
FIGS. 2A and 2B are explanatory views each illustrating an exemplary configuration of the stereoscopic display device shown in FIG. 1.
Figure 2B:
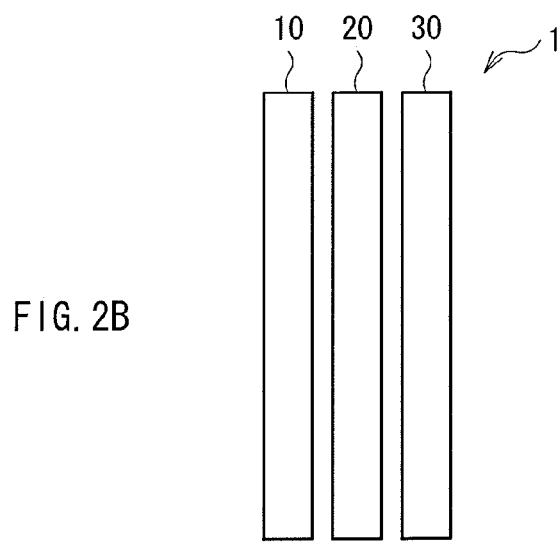

FIGS. 2A and 2B illustrate an exemplary configuration of an essential part of the stereoscopic display device 1; FIG. 2A illustrates a perspective configuration of the stereoscopic display device 1, and FIG. 2B illustrates a side configuration of the stereoscopic display device 1. Referring to FIGS. 2A and 2B, in the stereoscopic display device 1, from the backlight 30 side, the display section 20 and the liquid crystal barrier 10 are disposed in this order. That is, light emitted from the backlight 30 reaches a viewer through the display section 20 and the liquid crystal barrier 10. Desirably, for the purpose of reducing light loss, the display section 20 and the liquid crystal barrier 10 are disposed in a state of being stuck to each other.

(Display Driving Section 50 and Display Section 20)

Figure 3:
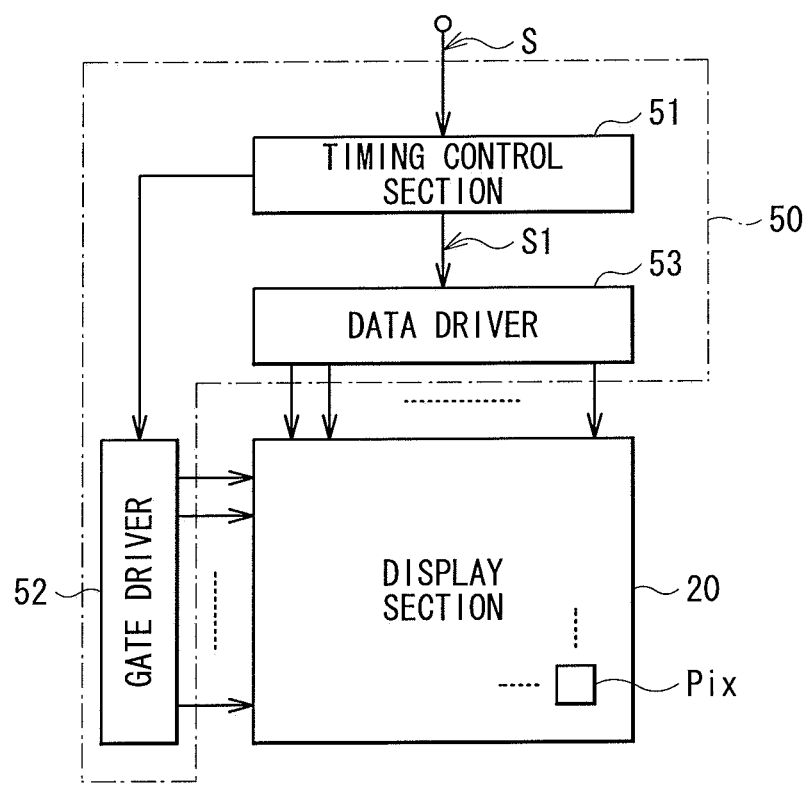
FIG. 3 is an explanatory view illustrating an exemplary configuration of the display section shown in FIG. 1.

FIG. 3 illustrates an example of a block diagram of the display driving section 50 and the display section 20. Pixels Pix are disposed in a matrix form in the display section 20.

The display driving section 50 includes a timing control section 51, a gate driver 52, and a data driver 53. The timing control section 51 controls the drive timing of the gate driver 52 and data driver 53, and supplies the data driver 53 with an image signal S, which is supplied from the control section 40, as an image signal S1. According to a timing control by the timing control section 51, the gate driver 52 sequentially selects the pixels Pix in the display section 20 (described later) on a row by row basis, and performs a line sequential scanning. The data driver 53 supplies to each pixel Pix in the display section 20 a pixel signal based on the image signal S1. Specifically, the data driver 53 converts the signal from digital to analog (D/A) on the basis of the image signal S1 to generate a pixel signal serving as analog signal, and supplies the generated pixel signal to each pixel Pix.

The display section 20 is, for example, a section in which a liquid crystal material is sealed between two transparent substrates formed of glass or the like. A transparent electrode formed of ITO (Indium Tin Oxide) or the like is formed on the transparent substrate on the side facing the liquid crystal material, and the transparent electrode and the liquid crystal material configure the pixel Pix. The liquid crystal material used in the display section 20 is, for example, a nematic liquid crystal, which is driven in VA mode, IPS mode, or the like. The configuration of the display section 20 (pixel Pix) is described in detail below.

Figure 4A:
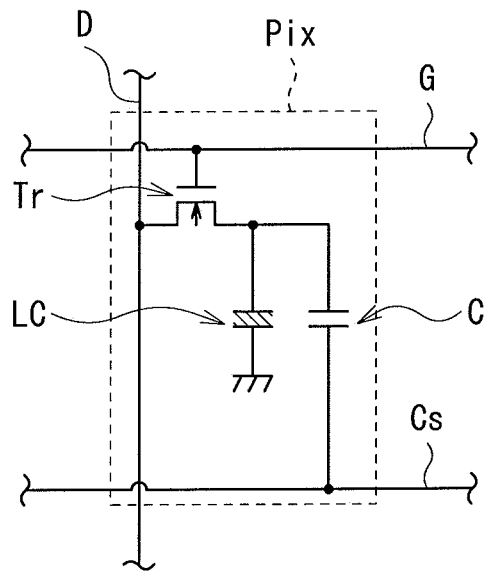
FIG. 4A is an exemplary view illustrating a pixel circuit configuration shown in FIG. 3.

FIG. 4A is an exemplary circuit diagram of the pixel Pix. The pixel Pix includes a TFT (Thin Film Transistor) element Tr, a liquid crystal element LC, and a holding capacitance element C. The TFT element Tr is configured of, for example, MOS-FET (Metal Oxide Semiconductor-Field Effect Transistor), and a gate of the TFT element Tr is connected to a gate line G, a source thereof is connected to a data line D, and a drain thereof is connected to one end of the liquid crystal element LC and one end of the holding capacitance element C. One end of the liquid crystal element LC is connected to a drain of the TFT element Tr, and the other end is connected to ground. One end of the holding capacitance element C is connected to the drain of the TFT element Tr, and the other end is connected to a holding capacitance line Cs. The gate line G is connected to the gate driver 52, and the data line D is connected to the data driver 53.

Figure 4B:
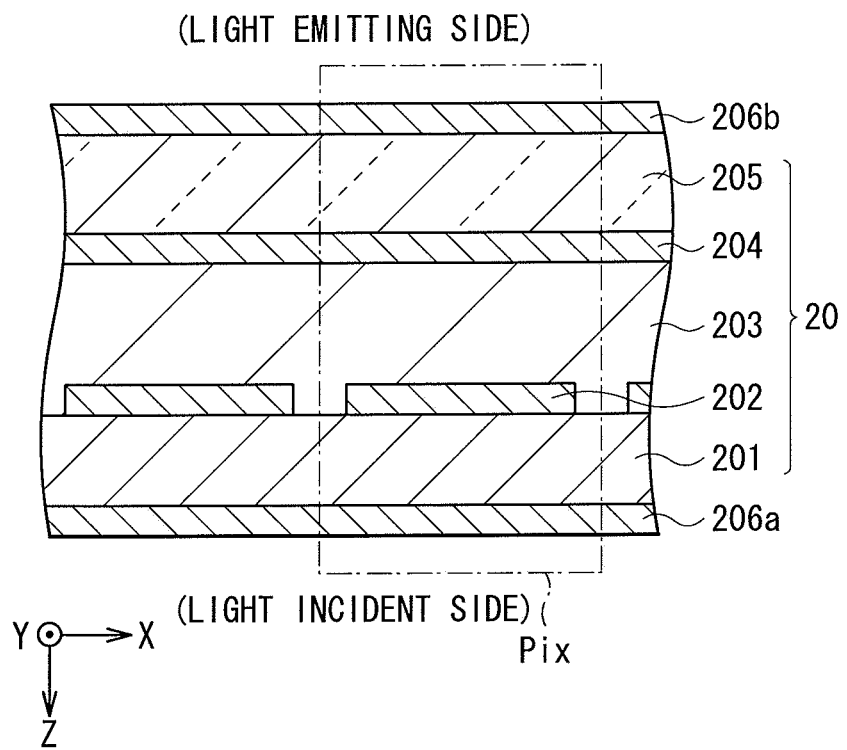
FIG. 4B is an exemplary view illustrating a sectional configuration of the pixel shown in FIG. 3.

FIG. 4B illustrates a sectional configuration of the display section 20 including the pixels Pix. As shown in FIG. 4B, when viewed in section, the display section 20 is a section in which a liquid crystal layer 203 is sealed between a driving substrate 201 and a counter substrate 205. The driving substrate 201 has a pixel drive circuit including the above-mentioned TFT element Tr formed therein, and a pixel electrode 202 is disposed on the driving substrate 201 for each pixel Pix. The counter substrate 205 has a color filter or a black matrix (not shown in the figure) formed therein. Further, the counter substrate 205 is provided with, on the liquid crystal layer 203 side thereof, a counter electrode 204 serving as a common electrode common to the pixels Pix.

A polarization plate 206a is stuck on the light incident side (backlight 30 side) of the display section 20, thereby controlling a polarization direction of light incident on the liquid crystal layer 203. On the other hand, a polarization plate 206b is stuck on the light emitting side of the display section 20. The polarization plate 206a and polarization plate 206b are stuck together in a crossed Nicol state.

(Backlight 30)

Figure 5:
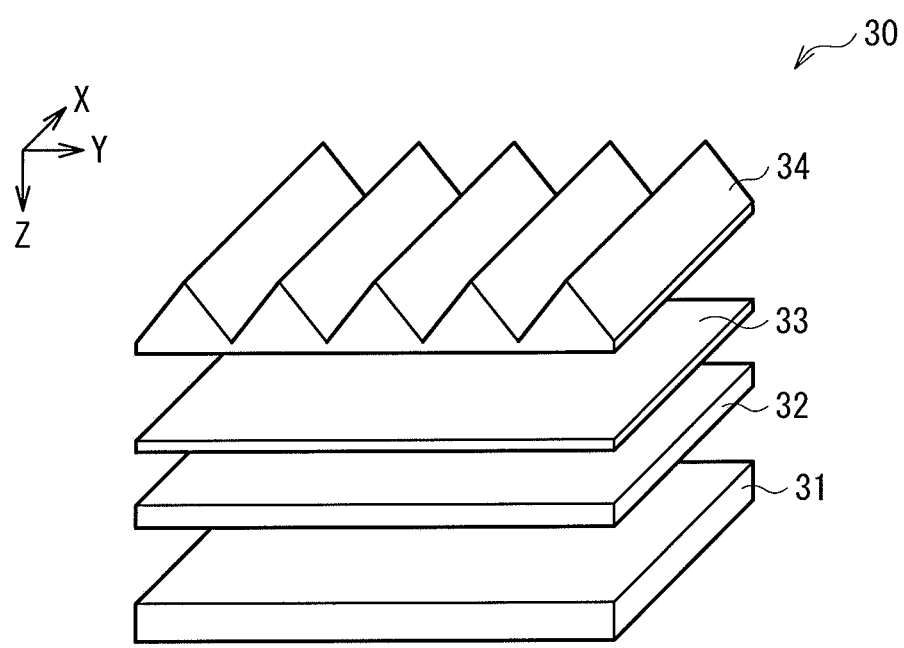
FIG. 5 is an explanatory view illustrating an exemplary configuration of the backlight shown in FIG. 1.

FIG. 5 illustrates an exemplary configuration of the backlight 30. The backlight 30 includes in order from a light source section 31 side, a diffusion plate 32, a diffusion sheet 33, and a lens sheet 34, for example. The light source section 31 is a section in which a plurality of CCFLs (Cold Cathode Fluorescent Lamp) are disposed on a substrate (or a reflection plate), for example. Alternatively, the light source section 31 may be a section in which LED (Light Emitting Diode) is disposed on the side face of a light guide plate, for example. The diffusion plate 32 and the diffusion sheet 33 are intended to equalize uneven brightness (for example, luminance unevenness due to an arrangement of CCFLs) in a plane of the light emitted from the light source section 31.

The lens sheet 34 is a luminance enhancement film by which incident light is collected along a predetermined direction in order to improve a luminance in a front face direction. The lens sheet 34 is disposed such that its light collecting function is performed more efficiently in the vertical direction (Y direction) than in the horizontal direction (X direction). Specifically, the lens sheet 34 has a plurality of triangular prisms extending along one direction, and the lens sheet 34 is disposed such that the prisms extends horizontally. Consequently, light incident on the lens sheet 34 is refracted, in the vertical direction, substantially toward the front face direction according to the triangular cross-sectional shape. As a result, it is possible to achieve high front luminance, without narrowing the viewing angle in the horizontal direction.

It is to be noted that the cross-sectional shape of each prism of the lens sheet 34 is not limited to the above-mentioned triangular shape. Alternatively, the cross-sectional shape of each prism of the lens sheet 34 may be semicircular shape, other polygonal shapes, or rounded polygonal shape. As the lens sheet 34, a BEF made by Sumitomo 3M Limited may be adopted, for example.

(Liquid Crystal Barrier 10)

FIGS. 6A and 6B illustrate an exemplary configuration of the liquid crystal barrier 10. FIG. 6A is a plan view of the liquid crystal barrier 10, and FIG. 6B is a sectional view taken along I-I line of FIG. 6A. In this example, description will be made assuming that the liquid crystal barrier 10 is driven in VA mode, IPS mode, or the like, and that the liquid crystal barrier 10 operates in normally black mode. Specifically, in a state where a drive voltage is not applied, light is blocked (a black display is established) whereas in a state where a drive voltage is applied, light is transmitted (a white display is established). However, the operation mode is not limited to the normally black mode. Alternatively, a normally white mode may be adopted as the operation mode, for example. The selection between the normally black mode and normally white mode is made due to the polarization plate and the liquid crystal orientation, for example.

The liquid crystal barrier 10 has a plurality of opening-closing sections 11 and 12 for transmitting or blocking light. The opening-closing sections 11 and 12 change the operation mode thereof according to whether the stereoscopic display device 1 performs a normal display (two-dimensional display) or a stereoscopic display. Specifically, as described later, the opening-closing section 11 exhibits an open state (transmit state, or white display) in a normal display mode, and exhibits a closed state (block state, or black display) in a stereoscopic display mode. The opening-closing section 12 exhibits an open state (transmit state) in a normal display, and carries out an opening and closing operation in a time-divisional manner in a stereoscopic display, as described later. The plurality of opening-closing sections 11 and 12 are alternately laid out, and, for example, it is possible to operate the opening-closing sections 11 and 12 in groups each composed of opening-closing sections selected from the plurality of opening-closing sections 11 and 12, and further, it is possible to carry out such an operation performed on a group by group basis in a time-divisional manner.

As shown in the cross-sectional view, the liquid crystal barrier 10 has a liquid crystal layer 14 provided between a transparent substrate 13A and a transparent substrate 13B formed of glass or the like, for example. Of the transparent substrates 13A and 13B, the transparent substrate 13A is disposed on the light incident side, and the transparent substrate 13B is disposed on the light emitting side. Transparent electrodes 15a and 15b, each composed of ITO or the like, are formed on the liquid crystal layer 14 side of the transparent substrate 13A, and on the liquid crystal layer 14 side of the transparent substrate 13B, respectively. Polarization plates 18a and 18b are stuck to the light incident side of the transparent substrate 13A, and the light emitting side of the transparent substrate 13B, respectively. In the following, each section will be described in detail.

Figure 7:
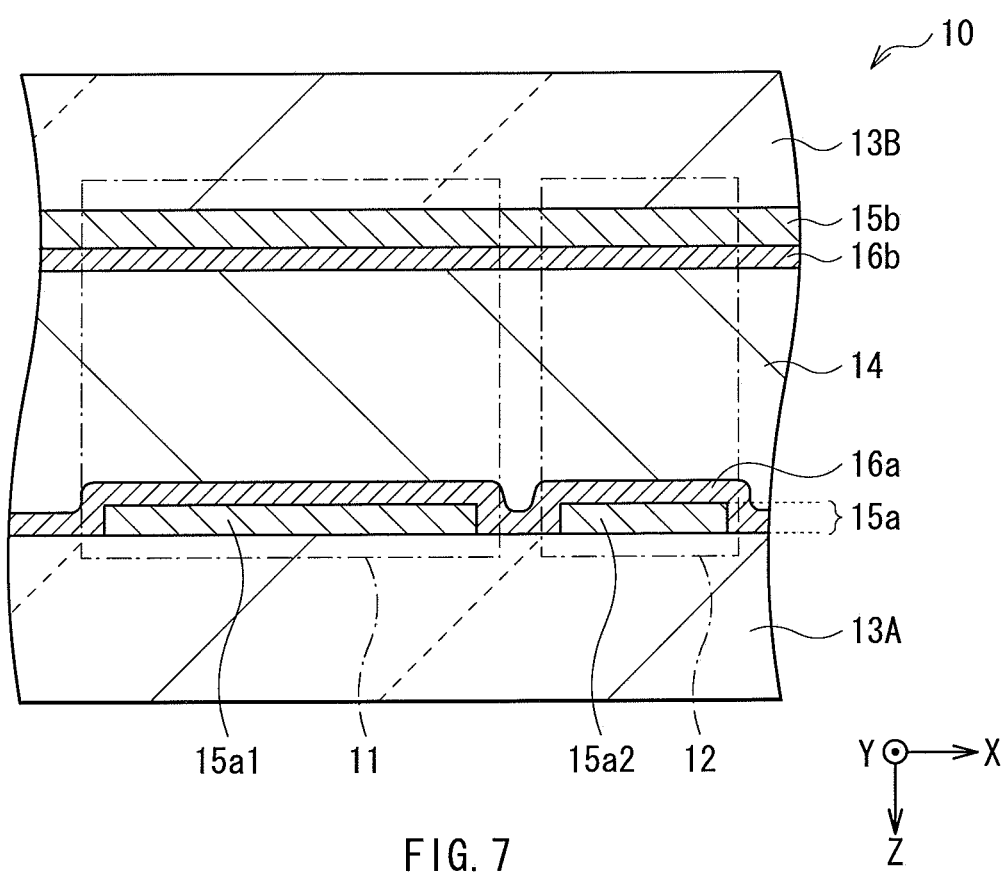
FIG. 7 is an explanatory view illustrating a detailed exemplary configuration of a sectional configuration of the liquid crystal barrier shown in FIG. 1.

FIG. 7 illustrates a sectional configuration of the liquid crystal barrier 10 taken along II-II line of FIG. 6A. At least one of the transparent electrodes 15a and 15b is divided into a plurality of sub-electrodes to which voltage can be applied individually. For example, the transparent electrode 15a is divided into a plurality of sub-electrodes 15a1 and 15a2, and the transparent electrode 15b is disposed as a common electrode common to each of the sub-electrodes 15a1 and 15a2. The regions corresponding to the sub-electrodes 15a1 and 15a2 are the opening-closing sections 11 and 12, respectively. With this configuration, voltage is applied only to a selective region of the liquid crystal layer 14, and the opening-closing sections 11 and 12 are individually switched between a transmit state (white display) and a block state (black display). In addition, orientation films 16a and 16b by which an orientation of the liquid crystal layer 14 is controlled are formed on the transparent electrodes 15a and 15b.

The orientation control at the orientation films 16a and 16b is established by a rubbing treatment, for example, and configured according to a mode of a liquid crystal used for the liquid crystal layer 14, and a polarization axis of a polarization plate described later, for example. Specifically, a rubbing treatment is applied such that, orientation control directions of the orientation films 16a and 16b are at right angles to each other, and that liquid crystal molecules in the vicinity of the surfaces of the orientation films 16a and 16b are oriented along directions corresponding to absorption axis directions of the polarization plate 18a and polarization plate 18b, respectively.

The polarization plate 18a and polarization plate 18b control the polarization direction of light incident on the liquid crystal layer 14 and the polarization direction of light emitted from the liquid crystal layer 14. The polarization plate 18a and the polarization plate 18b are laid out in such a manner that the absorption axes thereof are at right angles to each other (in a crossed Nicol state). It is to be noted that, as a film for widening viewing angle, a WV (wide view) film or the like may be inserted between the polarization plates 18a and the transparent substrate 13A, and between the polarization plates 18b and the transparent substrate 13B.

(Absorption Axis Direction of Each Polarization Plate)

Figure 8:
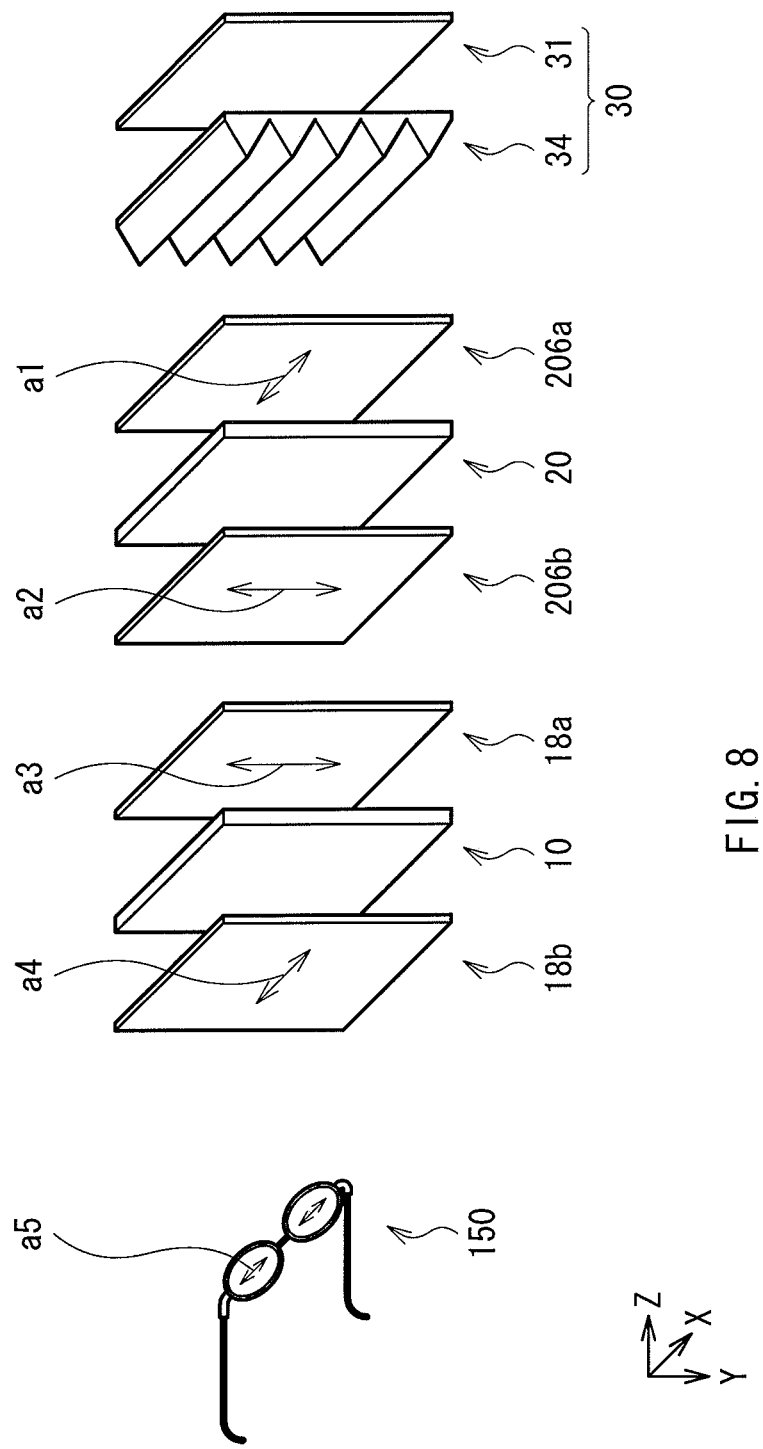
FIG. 8 is an explanatory view illustrating polarization axis direction of each of the polarization plates.

FIG. 8 is a schematic view for describing polarization axis direction of each of the polarization plates. As described above, in the present embodiment, in order from the backlight 30 side, the display section 20 and the liquid crystal barrier 10 are disposed. The polarization plates 206a and 206b are stuck on the light incident side and the light emitting side of the display section 20, respectively, while the polarization plates 18a and 18b are stuck on the light incident side and the light emitting side of the liquid crystal barrier 10, respectively. In other words, in order from the backlight 30 side, the polarization plates 206a, 206b, 18a, and 18b are provided, and the display section 20 is disposed at a region between the polarization plates 206a and 206b, whereas the liquid crystal barrier 10 is disposed at a region between the polarization plates 18a and 18b. In the embodiment, of these polarization plates, the polarization plate 206a is a specific example of the first polarization plate of the first display device of the present disclosure, and the polarization plate 18b is a specific example of the third polarization plate of the first display device of the present disclosure. In addition, the polarization plates 206b and 18a, which are disposed between the display section 20 and the liquid crystal barrier 10, are specific examples of the second and fourth polarization plates of the first display device of the present disclosure, respectively.

In such a structure, in the present embodiment, polarization axis direction (in this case, an exemplary absorption axis is illustrated) of each of the polarization plates is configured as follows. That is, as shown in FIG. 8, an absorption axis a1 of the polarization plate 206a disposed on the backlight 30 side is configured to correspond to the horizontal direction, and an absorption axis a2 of the polarization plate 206b is configured to correspond to a direction perpendicular to the absorption axis a1 (vertical direction). An absorption axis a3 of the polarization plate 18a is configured to be in the same direction as the absorption axis a2 of the polarization plate 206b (vertical direction), and an absorption axis a4 of the polarization plate 18b, which is disposed on the side closest to the viewer, is configured to correspond to the horizontal direction. It is to be noted that, in the present specification, "correspond" refers not only to a state in which axis directions are strickly identical to each other, but also to a state in which axis directions are nearly identical to each other. In addition, although only exemplary absorption axis of each of the polarization plates is described in this specification, a transmit axis is perpendicular to the absorption axis.

When performing a stereoscopic display, the barrier driving section 9 drives the plurality of opening-closing sections 11 and 12 such that the plurality of opening-closing sections 11 and 12 belonging to the same group perform an opening and closing operation at the same timing. Specifically, while details are described later, a plurality of opening-closing sections 12 belonging to the group A (opening-closing sections 12A) and a plurality of opening-closing sections 12 belonging to the group B (opening-closing sections 12B) are driven by the barrier driving section 9 so as to alternately perform an opening and closing operation in a time-divisional manner.

Figure 9:
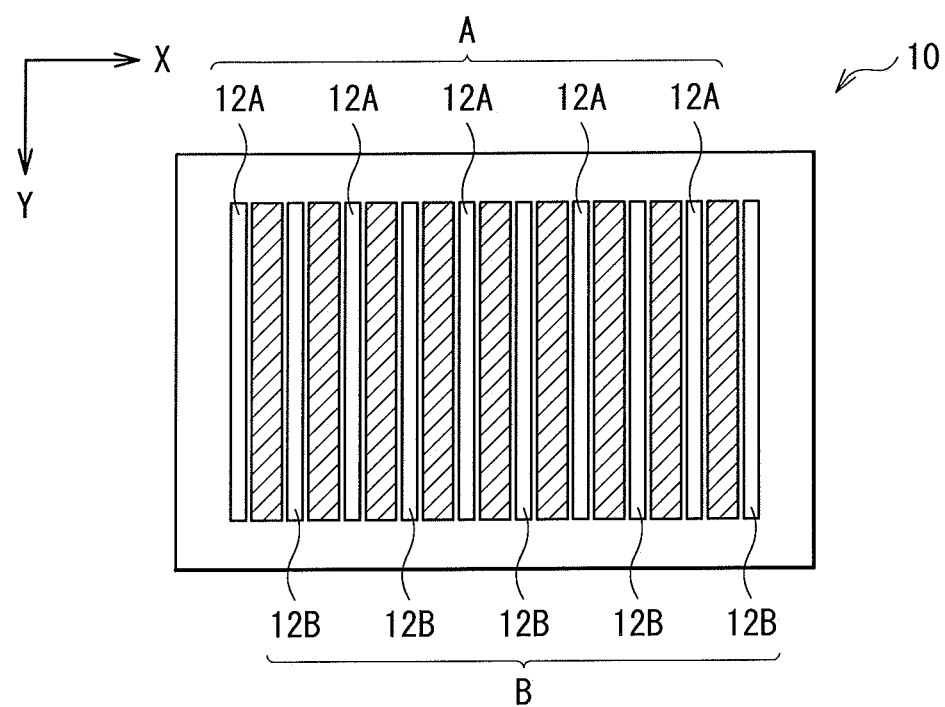
FIG. 9 is a schematic view illustrating an exemplary stereoscopic display operation of a liquid crystal barrier according to the embodiment.

FIG. 9 illustrates an exemplary group composition of the opening-closing sections 12. The opening-closing sections 12 are divided into a plurality of groups and driven on a group basis in a time-divisional manner. In this case, a plurality of opening-closing sections 12A and 12B are alternately laid out, and the plurality of opening- closing sections 12A form the group A, and the plurality of opening-closing sections 12B form the group B.

FIGS. 10A to 10C are schematic views illustrating states of the liquid crystal barrier 10 in a case the stereoscopic display is performed and in a case the normal display (two-dimensional display) is performed. FIG. 10A illustrates a state in which the stereoscopic display is performed, FIG. 10B illustrates another state in which the stereoscopic display is performed, and FIG. 10C illustrates a state in which the normal display is performed. The liquid crystal barrier 10 has the opening-closing sections 11 and the opening-closing sections 12 (opening-closing sections 12A and 12B) alternately laid out therein. In this example, each of the opening-closing sections 12A and 12B is provided for each six pixels Pix of the display section 20. While the following description will be given assuming that the pixel Pix is made up of three sub pixels RGB, this is not restrictive, and, for example, the pixel Pix may be a sub pixel. It is to be noted that in FIGS. 10A to 10C, the diagonal lines represent portions where light is blocked in the liquid crystal barrier 10.

In the case of performing the stereoscopic display, an image display based on image signals SA and SB is performed in the display section 20 in a time-divisional manner, and, in the liquid crystal barrier 10, the opening-closing sections 12 (opening-closing sections 12A and 12B) are opened or closed in synchronization with the above-mentioned display time-divisionally performed by the display section 20. At this time, the opening-closing sections 11 are maintained in a closed state (blocked state). Specifically, while details are described later, when an image signal SA is supplied to the liquid crystal barrier 10, the opening-closing sections 12A are brought into an open state, and the opening-closing sections 12B are brought into a closed state, as shown in FIG. 10A. The display section 20 causes the six pixels Pix adjacent to one another disposed at the positions corresponding to the opening-closing sections 12A to display six viewpoint images included in the image signal SA. In like manner, as illustrated in FIG. 10B, when an image signal SB is supplied to the liquid crystal barrier 10, the opening-closing sections 12B are brought into the open state, and the opening-closing sections 12A are brought into the closed state. The display section 20 causes the six pixels Pix adjacent to one another disposed at the positions corresponding to the opening-closing sections 12B to display six viewpoint images included in the image signal SB.

On the other hand, in the case of performing the normal display (two-dimensional display), as illustrated in FIG. 10C, a display on the basis of the image signal S is performed in the display section 20, while the opening-closing sections 11 and the opening-closing sections 12 (opening-closing sections 12A and 12B) are maintained in the open state (transmit state) in the liquid crystal barrier 10.

It is to be noted that a boundary portion of the opening-closing sections 23 is provided between the opening-closing sections 11 and the opening-closing sections 12. The boundary portion of the opening-closing sections 23 corresponds to a portion where either of the transparent electrodes 15a or 15b is not formed on the transparent substrates 13A and 13B. In other words, as described, at least one of the transparent electrodes 15a and 15b is divided into a plurality of sub-electrodes, and the boundary portion of the opening-closing sections 23 corresponds to the region between the sub-electrodes. Since it is difficult to apply desired voltage to the boundary portion of the opening-closing sections 23, the boundary portion of the opening-closing sections 23 typically exhibits a closed state (blocked state) in the liquid crystal barrier 10 in a normally black mode. However, since the boundary portion of the opening-closing sections 23 is sufficiently small in size relative to the opening-closing sections 11 and 12, it poses little problem for the viewer. In the following figures and descriptions, the boundary portion of the opening-closing sections 23 will be omitted.

[Operations and Functions]

Hereinafter, operations and functions of the stereoscopic display device 1 of the present embodiment will be described.

(Overview of General Operation)

On the basis of an externally supplied image signal Vdisp, the control section 40 supplies a control signal to each of the display driving section 50, backlight driving section 29, and barrier driving section 9, so as to control the display driving section 50, backlight driving section 29, and barrier driving section 9 to operate in synchronization with each other. The backlight driving section 29 drives the backlight 30 on the basis of the backlight control signal supplied from the control section 40. The backlight 30 emits plane emitting light to the display section 20. The display driving section 50 drives the display section 20 on the basis of an image signal S supplied from the control section 40. The display section 20 modulates light emitted from the backlight 30 to thereby perform a display. The barrier driving section 9 drives the liquid crystal barrier 10 on the basis of the barrier control order supplied from the control section 40. The liquid crystal barrier 10 transmits or blocks the light emitted from the backlight 30 and transmitted through the display section 20.

(Specific Operation of Stereoscopic Display)

Next, referring to some figures, specific operation for performing the stereoscopic display is described.

FIGS. 11A and 11B are schematic views illustrating exemplary operations of the display section 20 and the liquid crystal barrier 10. FIG. 11A illustrates a case where an image signal SA is supplied, and FIG. 11B illustrates a case where an image signal SB is supplied.

As illustrated in FIG. 11A, the display driving section 50, when an image signal SA is supplied, in the display section 20, causes the six pixels Pix adjacent to one another to display pixel information P1 to P6 for six pixels each corresponding to six viewpoint images included in the image signal SA. The six pixels for displaying pixel information P1 to P6 are pixels disposed adjacent to one another in the proximity of the opening and closing section 12A. On the other hand, as described above, in the liquid crystal barrier 10, the opening-closing sections 12A are brought into the open state (transmit state), and the opening-closing sections 12B are brought into the closed state (the opening-closing sections 11 are in the closed state). Consequently, the emission angle of light emitted from each pixel Pix of the display section 20 is restricted by the opening-closing section 12A. That is, six viewpoint images displayed in a space-divisional manner at the display section 20 is separated by the opening-closing section 12A. When the separated viewpoint images are viewed such that, for example, image light based on the pixel information P3 is viewed by the left eye of the viewer and image light based on the pixel information P4 is viewed by the right eye of the viewer, the image is recognized as a stereoscopic image by the viewer.

Likewise, in the case where an image signal SB is supplied, as illustrated in FIG. 11B, in the display section 20, display pixel information P1 to P6 for six pixels each corresponding to six viewpoint images included in the image signal SB are displayed in the six pixels Pix adjacent to one another. The six pixels for displaying pixel information P1 to P6 are pixels disposed adjacent to one another in the proximity of the opening-closing section 12B. On the other hand, as described above, in the liquid crystal barrier 10, the opening-closing sections 12B are controlled to be brought into the open state (transmit state), and the opening-closing sections 12A are controlled to be brought into the closed state (the opening-closing sections 11 are in the closed state). Consequently, emission angle of light emitted from each pixel Pix of the display section 20 is restricted by the opening-closing section 12B. That is, six viewpoint images displayed in a space-divisional manner at the display section 20 is separated by the opening-closing section 12B. When the separated viewpoint images are viewed such that, for example, image light based on the pixel information P3 is viewed by the left eye of the viewer and image light based on the pixel information P4 is viewed by the right eye of the viewer, the image is recognized as a stereoscopic image by the viewer.

In this way, different pixel information out of the pixel information P1 to P6 are viewed by the left and right eyes of the viewer, so that it is possible for the viewer to recognize the image as a stereoscopic image. In addition the image is displayed such that the opening-closing sections 12A and the opening-closing sections 12B are alternately opened in a time-divisional manner, so that the viewer averages and views the image displayed at the positions shifted from each other. Therefore, in comparison with a case where a plurality of opening-closing sections 12 are collectively driven without being divided in groups, it is possible to implement the stereoscopic display device 1 with a twofold resolution. In other words, the resolution of the stereoscopic display device 1 may be $\frac{1}{3}(=\frac{1}{6\times 2})$ relative to the case of the two-dimensional display.

Meanwhile, the above-mentioned display section 20 and liquid crystal barrier 10 each use the liquid crystal, and therefore a polarization plate is provided on the light incident side and on the light emitting side of each of the display section 20 and liquid crystal barrier 10 in order to control the polarization direction of incident light and emitted light. In the following, functions and effects of the polarization axes of these polarization plates will be described with comparative examples (comparative examples 1 and 2).

COMPARATIVE EXAMPLE

Figure 12:
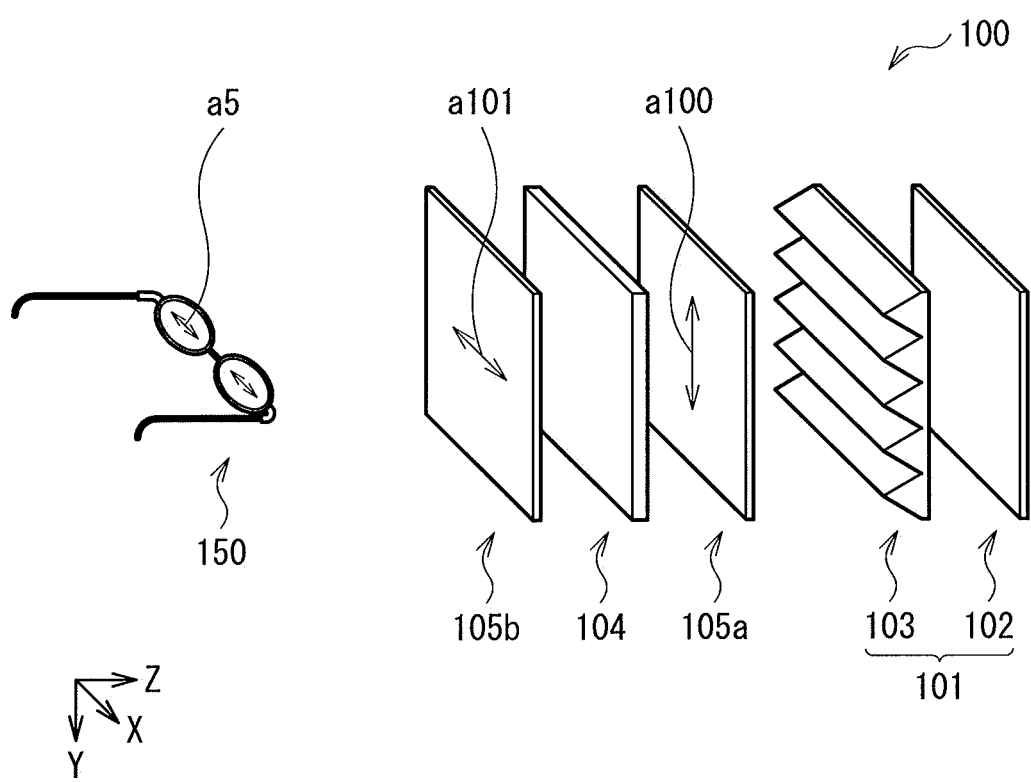
FIG. 12 is an explanatory view illustrating polarization axis directions in a liquid crystal display device according to comparative example 1.

FIG. 12 is a schematic view for describing polarization axis direction of each polarization plate of a liquid crystal display device (liquid crystal display device 100) according to comparative example 1 of the present embodiment. The liquid crystal display device 100 is a display device for performing a normal two-dimensional image display. That is, the liquid crystal display device 100 does not include the above-mentioned liquid crystal barrier, and the liquid crystal display device 100 includes a display section 104 disposed on the light emitting side of a backlight 101. The backlight 101 has a light source section 102 including CCFL or the like, and a lens sheet 103. Similarly to the lens sheet 34 of the present embodiment, the lens sheet 103 has a plurality of prisms extending along the horizontal direction, and incident light is more efficiently collected in the vertical direction than in the horizontal direction, thereby realizing high front luminance. The display section 104 includes a liquid crystal layer of VA mode, and a polarization plate 105a is stuck to the light incident side thereof whereas a polarization plate 105b is stuck to the light emitting side thereof. The polarization plates 105a and 105b are disposed such that the absorption axis a100 of the polarization plate 105a and the absorption axis a101 of the polarization plate 105b are at right angles to each other.

Thus, image light emitted from the liquid crystal display device 100 having no liquid crystal barrier becomes polarized light dependent on the absorption axis a101 of the polarization plate (polarization plate 105b) disposed on the side closest to the viewer.

In many cases, in the liquid crystal display device 100, the absorption axis a101 of the polarization plate 105b disposed on the viewer side is configured to coincide in direction with the absorption axis a5 of a polarized eyeglasses 150 so that a displayed image is visually recognized through the polarized eyeglasses 150 such as polarized sunglasses. That is, in the polarized eyeglasses 150, in order to cut the reflected light component from water surface and the like, the absorption axis a5 is configured to correspond to the horizontal direction in many cases. In such cases, the absorption axis a101 of the polarization plate 105b is also configured to correspond to the horizontal direction.

Figure 13:
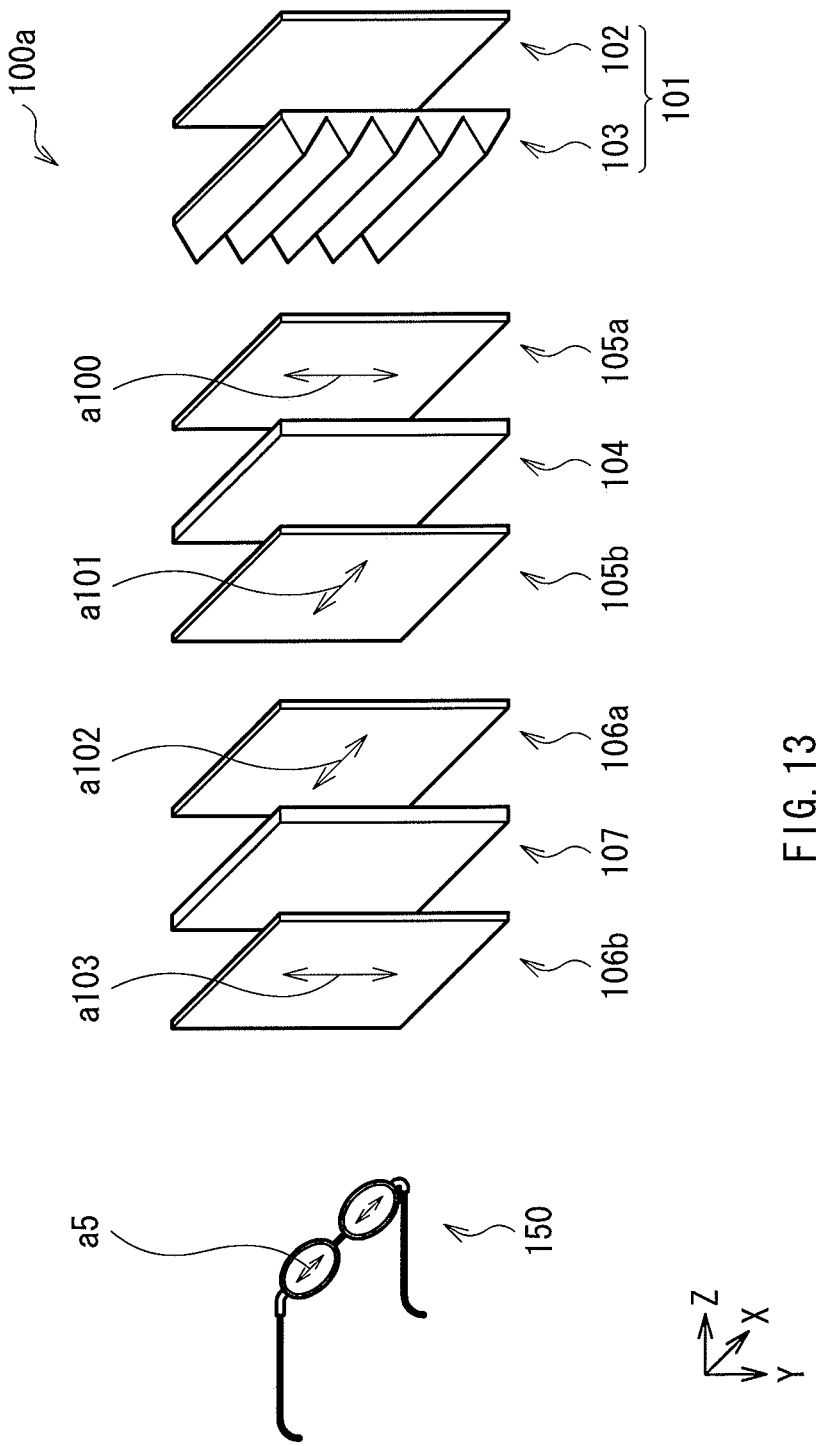
FIG. 13 is an explanatory view illustrating polarization axis directions in a stereoscopic display device according to comparative example 2.

However, in the case where a liquid crystal barrier is additionally provided on the light emitting side of the above-mentioned liquid crystal display device 100, polarization plates are disposed as follows. Polarization axis directions in a stereoscopic display device (stereoscopic display device 100a) according to comparative example 2 are schematically illustrated in FIG. 13. The stereoscopic display device 100a has a liquid crystal barrier 107 disposed on the light emitting side of the polarization plate 105b, a polarization plate 106a stuck on the light incident side of the liquid crystal barrier 107, and a polarization plate 106b stuck on the light emitting side of the liquid crystal barrier 107. In this case, an absorption axis a102 of the polarization plate 106a corresponds to the horizontal direction, which is the same direction as an absorption axis a101, and an absorption axis a103 of the polarization plate 106b corresponds to the vertical direction. Accordingly, the absorption axis a103 (vertical direction) of the polarization plate 106b disposed on the side closest to the viewer does not correspond to an absorption axis a5 (horizontal direction) of a polarized eyeglasses 150, and therefore, when viewed through the polarized eyeglasses 150, the display image can be visually recognized as a completely dark image.

In contrast, in the present embodiment, as shown in FIG. 8, the polarization axes of the polarization plates are configured such that the absorption axis a1 of the polarization plate 206a corresponds to the horizontal direction, that the absorption axis a2 of the polarization plate 206b corresponds to the vertical direction, that the absorption axis a3 of the polarization plate 18a corresponds to the vertical direction, and that the absorption axis a4 of the polarization plate 18b corresponds to the horizontal direction. That is, the absorption axis a4 of the polarization plate 18b disposed on the side closest to the viewer is configured to correspond to the horizontal direction which is the same direction as the absorption axis a5 of the polarized eyeglasses 150. This makes it easy for the image light emitted from the polarization plate 18b to be visually recognized through the polarized eyeglasses 150.

In addition, with the polarization axes configured as above, the absorption axis a1 of the polarization plate 206a disposed on the side closest to the backlight 30 corresponds to the horizontal direction. As described above, the backlight 30 is provided with the lens sheet 34 to enhance luminance, and the lens sheet 34 is provided with a predetermined prism which is configured such that its light collecting function is more efficiently performed in the vertical direction than in the horizontal direction. When the lens sheet 34 configured as above is provided, light emitted from the backlight 30 contains more polarization component in the vertical direction than that in the horizontal direction. Under such circumstances, in the above-mentioned comparative examples 1 and 2, since the absorption axis a100 of the polarization plate 105a disposed on the side closest to the backlight 101 corresponds to the vertical direction, great light loss can be caused when the light passes through the polarization plate 105a. On the contrary, in the present embodiment, as described above, since the absorption axis a1 of the polarization plate 206a disposed on the backlight 30 side corresponds to the horizontal direction, it is possible for the display section 20 to receive effectively the light emitted from the backlight 30 having the lens sheet 34.

As an example, light transmission rate of the backlight configured as illustrated in FIG. 5 was measured in such a manner that a BEF3 was used as the lens sheet 34, and that a polarization plate was disposed on the light emitting side of the BEF3. At this time, light transmission rate was measured in two cases: a case where an absorption axis of the polarization plate is configured to correspond to the vertical direction (corresponding to the comparative examples 1 and 2), and a case where an absorption axis of the polarization plate is configured to correspond to the horizontal direction (corresponding to the present embodiment). As a result, it was found that the light transmission rate achieved in the present embodiment was improved by as much as 10% compared to the light transmission rate achieved in the comparative examples 1 and 2.

As described above, according to the present embodiment, in the process where light emitted from the backlight 30 passes through the polarization plates 206a, 206b, 18a, and 18b in this order, the display section 20 performs an image display in a space-divisional manner, and each of the opening-closing sections 11 and 12 of the liquid crystal barrier 10 transmits or blocks the light to separate the image, and thereby a stereoscopic display is accomplished. In this case, although the absorption axis a5 of the polarized eyeglasses 150 such as polarized sunglasses is configured to correspond to the horizontal direction, the absorption axis a4 of the polarization plate 18b is also configured to correspond to the horizontal direction. Therefore, it is easy for the image light emitted from the polarization plate 18b to be visually recognized through the polarized eyeglasses 150 the image light emitted from the polarization plate 18b. Consequently, it is possible to implement a stereoscopic display of the parallax barrier system while maintaining good visibility for the viewer wearing polarized eyeglasses.

Next, stereoscopic display devices according to modifications (modifications 1 to 4) of the above described embodiment will be described. It is to be noted that, the same reference numerals are attached to the components similar to those of the above-mentioned embodiment, and description thereof is appropriately omitted.

(Modification 1)

Figure 14:
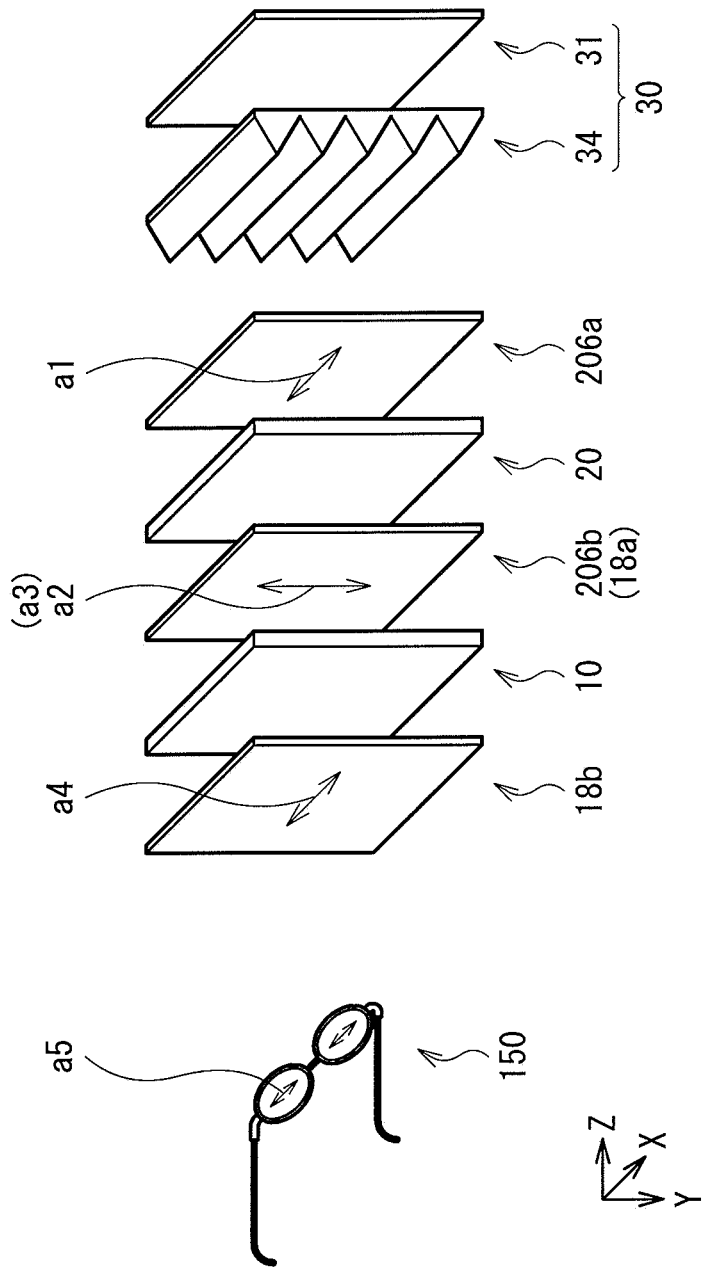
FIG. 14 is an explanatory view illustrating polarization axis directions in a stereoscopic display device according to modification 1.

FIG. 14 is a schematic view for describing polarization axis direction of each of the polarization plate in modification 1. Similarly to the above-mentioned embodiment, a stereoscopic display device according to the modification 1 includes, in order from a backlight 30 side, a display section 20, and a liquid crystal barrier 10 driven in VA mode. In addition, a polarization plate 206a serving as the first polarization plate of the present disclosure is disposed on the side closest to the backlight 30, and a polarization plate 18b serving as the third polarization plate of the present disclosure is disposed on the side closest to the viewer. It is to be noted that, in the modification 1, the polarization plate 206b disposed on the light emitting side of the display section 20 also serves as the polarization plate 18a disposed on the light incident side of the liquid crystal barrier 10. That is, only one polarization plate is disposed between the display section 20 and the liquid crystal barrier 10.

In such a structure, also in the modification 1, an absorption axis a4 of the polarization plate 18b disposed on the viewer side corresponds to the horizontal direction. In addition, an absorption axis a1 of the polarization plate 206a disposed on the backlight 30 side corresponds to the horizontal direction, and an absorption axis a2 (a3) of the polarization plate 206b serving also as the polarization plate 18a corresponds to the vertical direction.

In the modification 1, similarly to the above-mentioned embodiment, in the process where light emitted from the backlight 30 passes through the polarization plates 206a, 206b (18a), and 18b in this order, the display section 20 performs an image display in a space-divisional manner, and each of the opening-closing sections 11 and 12 of the liquid crystal barrier 10 transmits or blocks the light to separate the image, thereby a stereoscopic display is accomplished. In this case, the absorption axis a4 of the polarization plate 18b is configured to correspond to the horizontal direction, which is the same direction as an absorption axis a5 of polarized eyeglasses 150. Therefore, it is easy for the image light emitted from the polarization plate 18b to be visually recognized through the polarized eyeglasses 150. Therefore, it is possible to achieve an effect equivalent to that of the above-mentioned embodiment.

(Modification 2)

Figure 15:
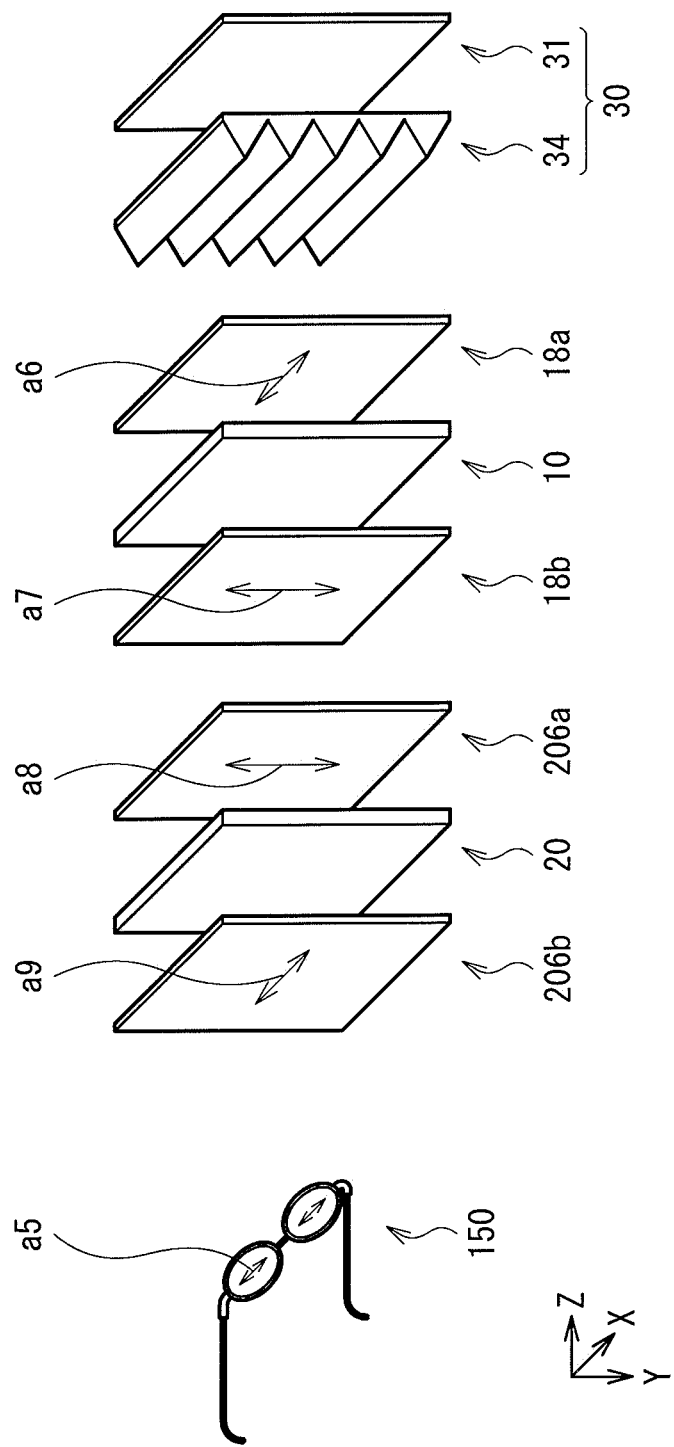
FIG. 15 is an explanatory view illustrating polarization axis directions in a stereoscopic display device according to modification 2.

FIG. 15 is a schematic view for describing polarization axis direction of each of the polarization plates in modification 2. Similarly to the above-mentioned embodiment, a stereoscopic display device of the modification 2 includes a backlight 30, a liquid crystal barrier 10 driven in VA mode, and a display section 20. In addition, polarization plates 18a and 18b are stuck to the light incident side and the light emitting side of the liquid crystal barrier 10, respectively, and polarization plates 206a and 206b are stuck to the light incident side and the light emitting side of the display section 20, respectively.

In the modification 2, however, the liquid crystal barrier 10 is disposed between the backlight 30 and the display section 20. That is, a polarization plate 18a serving as the first polarization plate of the present disclosure is disposed on the side closest to the backlight 30, and a polarization plate 206b serving as the third polarization plate of the present disclosure is disposed on the side closest to the viewer. In addition, the polarization plates 18b and 206a serving as the second and fourth polarization plates of the present disclosure are disposed between the liquid crystal barrier 10 and the display section 20. In such a structure, also in the modification 2, an absorption axis a9 of the polarization plate 206b disposed on the viewer side corresponds to the horizontal direction. In addition, an absorption axis a6 of the polarization plate 18a disposed on the backlight 30 side corresponds to the horizontal direction, and absorption axes a7 and a8 of the polarization plates 18b and 206a correspond to the vertical direction.

In the modification 2, similarly to the above-mentioned embodiment, in the process where light emitted from the backlight 30 passes through the polarization plates 18a, 18b, 206a, and 206b in this order, each of the opening-closing sections 11 and 12 of the liquid crystal barrier 10 transmits or blocks the light, and the display section 20 performs an image display in a space-divisional manner to separate the image, and thereby a stereoscopic display is accomplished. In this case, the absorption axis a9 of the polarization plate 206b is configured to correspond to the horizontal direction, which is the same direction as an absorption axis a5 of polarized eyeglasses 150. Therefore, it is easy for the image light emitted from the polarization plate 18b to be visually recognized through the polarized eyeglasses 150. Therefore, it is possible to achieve an effect equivalent to that of the above-mentioned embodiment.

It is to be noted that, also in the modification 2, similarly to the above-mentioned modification 1, a configuration in which the polarization plate 206a disposed on the light incident side of the display section 20 also serves as the polarization plate 18b disposed on the light emitting side of the liquid crystal barrier 10 may be adopted. That is, a configuration in which only one polarization plate is disposed between the display section 20 and the liquid crystal barrier 10 may be adopted.

(Modification 3)

Figure 16:
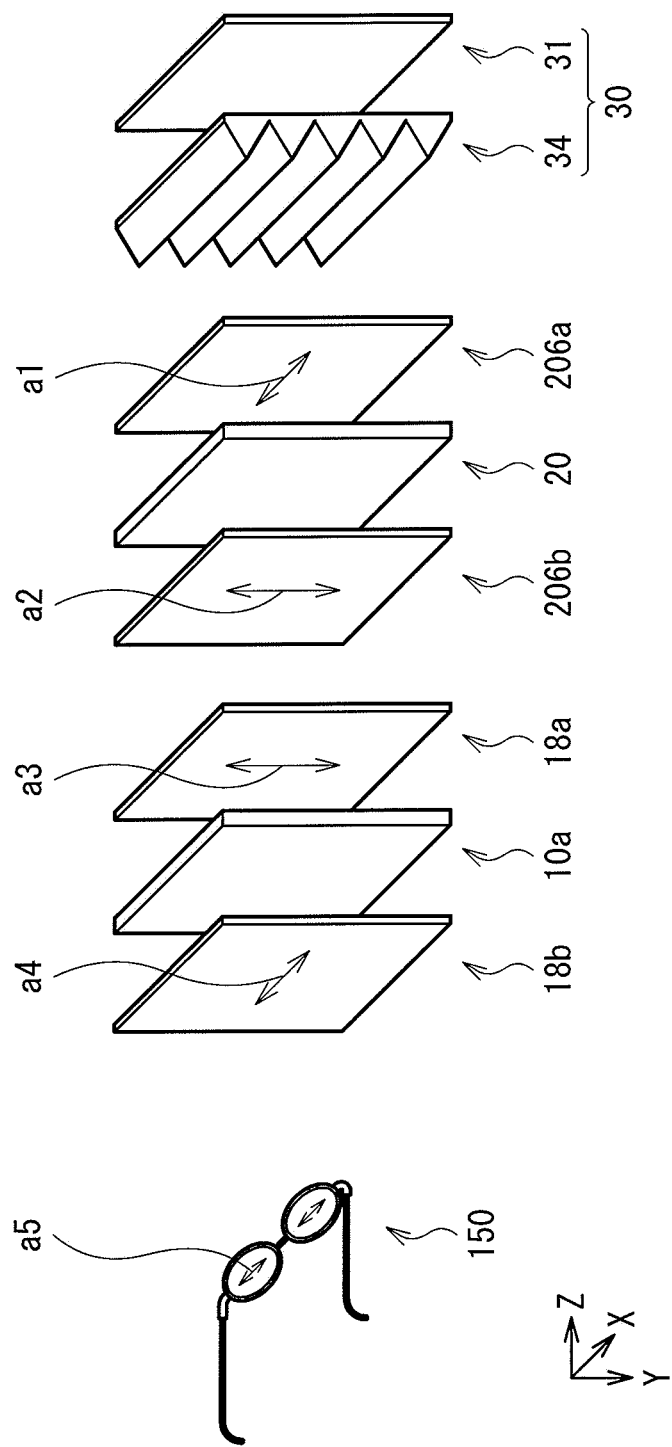
FIG. 16 is an explanatory view illustrating polarization axis directions in a stereoscopic display device according to modification 3.

FIG. 16 is a schematic view for describing polarization axis direction of each of the polarization plates in modification 3. Similarly to the above-mentioned embodiment, a stereoscopic display device of the modification 3 includes, in order from a backlight 30 side, a display section 20, and a liquid crystal barrier 10a. In addition, a polarization plate 206a serving as the first polarization plate of the present disclosure is disposed on the side closest to the backlight 30, and a polarization plate 18b serving as the third polarization plate of the present disclosure is disposed on the side closest to the viewer.

In the modification 3, however, the liquid crystal barrier 10a is driven in TN mode. In this case, the liquid crystal barrier 10a includes a liquid crystal layer formed of TN liquid crystal (not shown), and orientation of the liquid crystal layer is controlled such that orientation of the light incident side (light incident region) of the liquid crystal layer and orientation of the light emitting side (light emitting region) of the liquid crystal layer are at right angles to each other. In the case of a typical TN liquid crystal, orientation control (e.g., orientation control by rubbing treatment) is performed such that, one of the light incident side (light incident region) and the light emitting side (light emitting region) thereof is oriented at an angle of 45 degrees with respect to the horizontal direction, and that the other of the light incident side (light incident region) and the light emitting side (light emitting region) thereof is oriented at an angle of 135 degrees with respect to the horizontal direction (hereinafter referred to as oblique direction). In the modification 3, the liquid crystal layer is not oriented in the oblique direction, but orientation control is performed such that one of the light incident side (light incident region) and the light emitting side (light emitting region) thereof is configured to correspond to the horizontal direction, and the other of the light incident side (light incident region) and the light emitting side (light emitting region) thereof is configured to correspond to the vertical direction. It is to be noted that, in this case, whether each of the rubbing directions of the liquid crystal barrier 10a and absorption axes a3 and a4 of polarization plates 18a and 18b are parallel or orthogonal to each other depends on the mode of the liquid crystal molecules (O mode or E mode). In addition, the liquid crystal barrier 10a has substantially the same configuration as the liquid crystal barrier 10 of the above-mentioned embodiment, except that TN liquid crystal is used as the liquid crystal layer. The liquid crystal barrier 10a includes a plurality of opening-closing sections 11 and 12 (not shown) and the opening-closing sections 11 and 12 are driven to be opened or closed in a time-divisional manner.

Through the orientation control along the horizontal direction and vertical direction, it is possible to use a liquid crystal barrier 10a in TN mode in a manner similar to that in the liquid crystal barrier 10 in VA and IPS modes of the above-mentioned embodiment. That is, also in the modification 3, it is possible to dispose each of the polarization plates such that the absorption axis a4 of the polarization plate 18b disposed on the viewer side corresponds to the horizontal direction, that the absorption axis a1 of the polarization plate 206a disposed on the backlight 30 side corresponds to the horizontal direction, and that an absorption axis a2 of a polarization plate 206b and the absorption axis a3 of the polarization plate 18a respectively correspond to the vertical direction.

Consequently, also in the modification 3, similarly to the above-mentioned embodiment, in the process where light emitted from the backlight 30 passes through the polarization plates 206a, 206b, 18a, and 18b in this order, the display section 20 performs an image display in a space-divisional manner, and each of the opening-closing sections 11 and 12 of the liquid crystal barrier 10a transmits or blocks the light to separate the image, and thereby a stereoscopic display is accomplished. In this case, the absorption axis a4 of the polarization plate 18b is configured to correspond to the horizontal direction, which is the same direction as an absorption axis a5 of polarized eyeglasses 150. Therefore, it is easy for the image light emitted from the polarization plate 18b to be visually recognized through the polarized eyeglasses 150 the image light emitted from the polarization plate 18b. Therefore, it is possible to achieve an effect equivalent to that of the above-mentioned embodiment.

It is to be noted that also in the modification 3, similarly to the above-mentioned modification 1, a configuration in which the polarization plate 206b disposed on the light emitting side of the display section 20 also serves as the polarization plate 18a disposed on the light incident side of the liquid crystal barrier 10a may be adopted. That is, a configuration in which only one polarization plate is disposed between the display section 20 and the liquid crystal barrier 10a may be adopted. In addition, similarly to the above-mentioned modification 2, the liquid crystal barrier 10a may be disposed between the display section 20 and the backlight 30.

(Modification 4)

Figure 17:
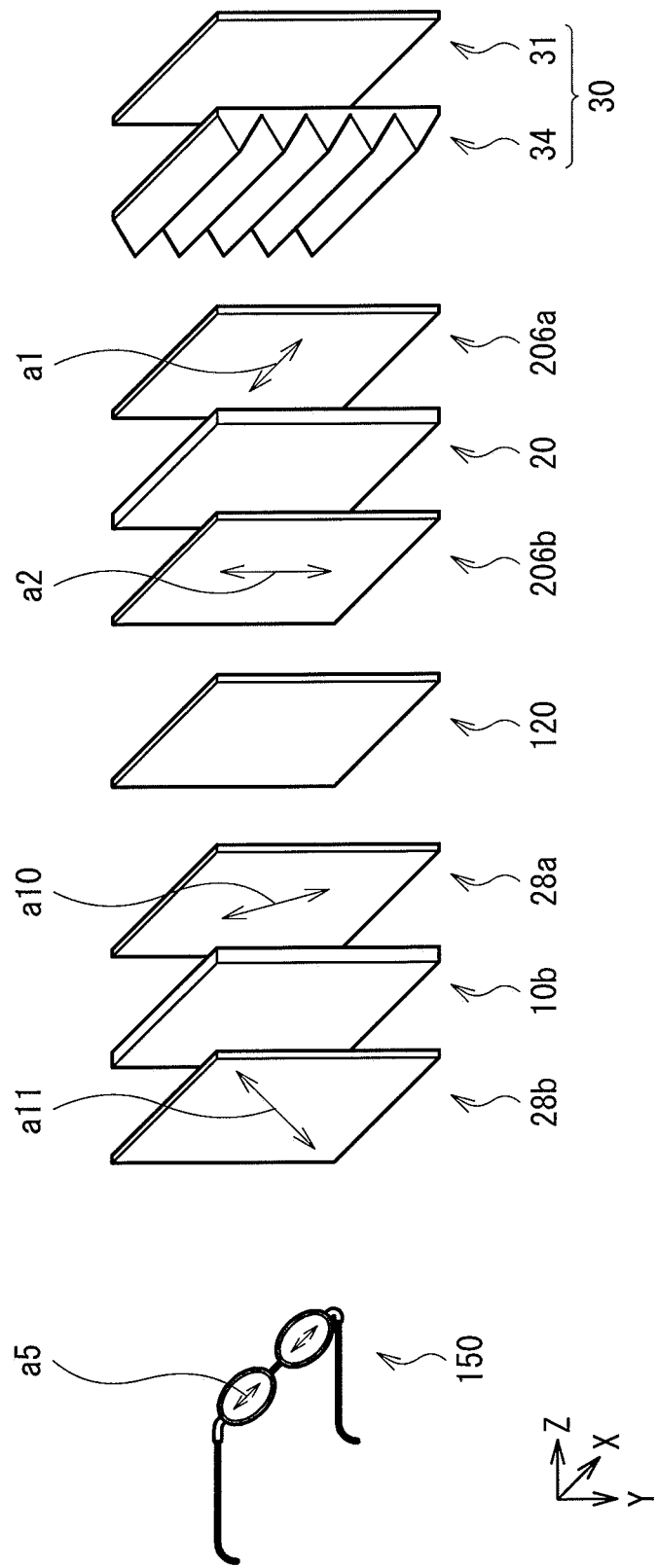
FIG. 17 is an explanatory view illustrating polarization axis directions in a stereoscopic display device according to modification 4.

FIG. 17 is a schematic view for describing polarization axis direction of each of the polarization plates in modification 4. Similarly to the above-mentioned embodiment, a stereoscopic display device of the modification 4 includes, in order from a backlight 30 side, a display section 20, and a liquid crystal barrier 10b. In addition, polarization plates 28a and 28b are stuck to the light incident side and the light emitting side of the liquid crystal barrier 10b, respectively, and polarization plates 206a and 206b are stuck to the light incident side and the light emitting side of the display section 20, respectively. In other words, the display section 20 is disposed between the polarization plates 206a and 206b, and the liquid crystal barrier 10b is disposed between the polarization plates 28a and 28b.

However, in the modification 4, the liquid crystal barrier 10b is driven in TN mode. In this case, the liquid crystal barrier 10b includes a liquid crystal layer formed of TN liquid crystal (not shown), and orientation of the liquid crystal layer is controlled (orientation is controlled by rubbing treatment, for example) such that orientation of the light incident side (light incident region) of the liquid crystal layer and orientation of the light emitting side (light emitting region) of the liquid crystal layer are at right angles to each other in the oblique direction (one of them is oriented at 45 degrees with respect to the horizontal direction, and the other is oriented at 135 degrees with respect to the horizontal direction). Therefore, in the modification 4, absorption axes a10 and a11 of the polarization plates 28a and 28b are also configured along the oblique direction according to the rubbing direction. It is to be noted that, whether each of the rubbing directions of the liquid crystal barrier 10b and absorption axes a10 and a11 of polarization plates 28a and 28b are parallel or orthogonal to each other depends on the mode of the liquid crystal molecules (O mode or E mode). In addition, the liquid crystal barrier 10b has substantially the same configuration as that of the liquid crystal barrier 10 of the above-mentioned embodiment, except that TN liquid crystal is used as the liquid crystal layer. The liquid crystal barrier 10b includes a plurality of opening-closing sections 11 and 12 (not shown) and the opening-closing sections 11 and 12 are driven to be opened or closed in a time-divisional manner.

In addition, an optical element such as a half-wave plate 120 for turning the polarization direction is disposed between the polarization plate 206b and the polarization plate 28a. With that, it is possible to efficiently present light emitted from the polarization plate 206b to the polarization plate 28a. Therefore, it is possible to use the liquid crystal barrier 10b in TN mode whose orientation is controlled in the oblique direction and whose absorption axis is configured to correspond to the oblique direction in combination with a display section 20 similar to that of the above-mentioned embodiment. Accordingly, an absorption axis a11 of the polarization plate 28b disposed on the viewer side corresponds to the direction oriented at, for example, an angle of 45 degrees with respect to the horizontal direction. It is to be noted that the absorption axis a1 of the polarization plate 206a disposed on the backlight 30 side corresponds to the horizontal direction, in a way similar to that in the above-mentioned embodiment. It is to be noted that, in the modification 4, the polarization plate 206a corresponds to "the first polarization plate", the polarization plate 206b corresponds to "the second polarization plate", the polarization plate 28a corresponds to "the third polarization plate", and the polarization plate 28b corresponds to "the forth polarization plate" of the second display device of the present disclosure.

In the modification 4, similarly to the above-mentioned embodiment, in the process where light emitted from the backlight 30 passes through the polarization plates 206a, 206b, 28a, and 28b in this order, the display section 20 performs an image display in a space-divisional manner, and each of the opening-closing sections 11 and 12 of the liquid crystal barrier 10b transmits or blocks the light to separate the image, and thereby a stereoscopic display is accomplished. In this case, the absorption axis a11 of the polarization plate 28b is configured to correspond to the diagonal direction (the direction oriented at an angle of 45 degrees with respect to the horizontal direction), so that the image light emitted from the polarization plate 28b contains polarization component of the vertical direction. Therefore, it is possible for the image light emitted from the polarization plate 28b to be visually recognized also through the polarized eyeglasses 150. Therefore, it is possible to achieve an effect substantially equivalent to that in the above-mentioned embodiment.

While the present disclosure has been described with reference to a preferred embodiment and modifications, the present disclosure is not limited to the embodiment and the modifications, and various modifications may be made. For example, in the above-mentioned embodiment and the modifications, a stereoscopic display is performed in such a manner that, in a plurality of opening-closing sections 11 and 12 of the liquid crystal barrier 10, the opening-closing section 11 is maintained in the closed state, and the opening-closing section 12 is driven to be in the open state based on an image signal. Alternatively, the stereoscopic display may be performed in an opposite manner. That is, the stereoscopic display may be performed such that the opening-closing section 12 is maintained in the closed state, and the opening-closing section 11 is brought into the open state based on the image signal.

In addition, in the above-mentioned embodiment and the modifications, for the purpose of realizing high resolution, out of the opening-closing sections 11 and 12, the opening-closing sections 12 are further divided into groups A and B, and the groups A and B are driven in a time-divisional manner. In the present disclosure, however, such an image display driven in a time-divisional manner is not necessarily needed. That is, the viewpoint image may be separated by carrying out an operation in which a11 of the opening-closing sections 11 of the liquid crystal barrier 10 are driven to be in the closed state and a11 of the opening-closing sections 12 of the liquid crystal barrier 10 is driven to be in the open state. Alternatively, it is also possible to divide the opening-closing sections 12 into three or more groups to sequentially drive the groups.

Further, while in the above-mentioned embodiment and the modifications the image signals SA and SB each include six viewpoint images, the present disclosure is not limited to this, and the number of viewpoint image included in each of the image signals SA and SB may be five or less or seven or more. For example, if the image signal includes five viewpoint images, one opening-closing section 12 may be provided for each five pixels Pix in the display section 20. However, the number of the viewpoint image may not necessarily correspond to the number of the pixel for displaying the viewpoint image. That is, for example, respective pixel information to be displayed on a plurality of pixels Pix adjacent to one another may not necessarily be different from one another, and pixel information on the same viewpoint image may be included therein. Further, the viewpoint images may include a blank (black or gray) image.

The present disclosure contains subject matter related to that disclosed in Japanese Priority Patent Application JP 2010-209717 filed in the Japan Patent Office on Sep. 17, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a light source section;
first to third polarization plates disposed in this order from a side of the light source section;
a liquid crystal display section provided in one of first and second regions, the first region lying between the first polarization plate and the second polarization plate and the second region lying between the second polarization plate and the third polarization plate;
a liquid crystal barrier section provided in the other of the first and second regions and including a plurality of opening-closing sections to transmit or block light, wherein
an absorption axis of the third polarization plate is horizontally directed;
further comprising a fourth polarization plate provided between the liquid crystal display section and the liquid crystal barrier section, and having an absorption axis directed to an orientation same as that of an absorption axis of the second polarization plate,
wherein the absorption axis of the second polarization plate and the absorption axis of the fourth polarization plate are vertically directed.

2. The display device according to claim 1, wherein the liquid crystal display section is driven in VA (Vertical Alignment) mode or IPS (In Plane Switching) mode.

3. The display device according to claim 2, wherein the liquid crystal barrier section is driven in VA mode or IPS mode.

4. The display device according to claim 2, wherein the liquid crystal barrier section is driven in TN (Twisted Nematic) mode.

5. The display device according to claim 4, wherein the liquid crystal barrier section includes a liquid crystal layer, one of a light incident region and a light emitting region of the liquid crystal layer being horizontally oriented, whereas another of the two regions being vertically oriented.

6. The display device according to claim 1, wherein an absorption axis of the first polarization plate is horizontally directed.

7. A display device comprising:
a light source section;
first to third polarization plates disposed in this order from a side of the light source section;
a liquid crystal display section provided in one of first and second regions, the first region lying between the first polarization plate and the second polarization plate and the second region lying between the second polarization plate and the third polarization plate;
a liquid crystal barrier section provided in the other of the first and second regions and including a plurality of opening-closing sections to transmit or block light, wherein
an absorption axis of the third polarization plate is horizontally directed;
further comprising a luminance enhancement film provided between the first polarization plate and the light source section and performing a light collecting function more efficiently in a vertical direction than in a horizontal direction.

8. A display device comprising:
a light source section;
first to fourth polarization plates disposed in this order from a side of the light source section;
a liquid crystal display section provided between the first polarization plate and the second polarization plate;
a liquid crystal barrier section provided between the third polarization plate and the fourth polarization plate and including a plurality of opening-closing sections to transmit or block light;
a half-wavelength plate provided between the second polarization plate and the third polarization plate, wherein
an absorption axis of the fourth polarization plate is directed to an orientation of 45 degrees from a horizontal direction.

9. The display device according to claim 8, wherein the liquid crystal display section is driven in VA mode or TS mode, and
the liquid crystal barrier section is driven in TN mode.

10. The display device according to claim 8, wherein an absorption axis of the first polarization plate is horizontally directed.

11. The display device according to claim 10, further comprising a luminance enhancement film provided between the first polarization plate and the light source section and performing a light collecting function more efficiently in a vertical direction than in the horizontal direction.

* * * * *